United States Patent [19]
Batty et al.

[11] Patent Number: 5,949,975
[45] Date of Patent: Sep. 7, 1999

[54] METHOD AND SYSTEM FOR NEGOTIATING CAPABILITIES WHEN SHARING AN APPLICATION PROGRAM WITH MULTIPLE COMPUTER SYSTEMS

[75] Inventors: John P. Batty; Anthony M. Downes, both of London; Kenneth P. Hughes, East Sussex; Roderick F. MacFarquhar, London; Christopher J. Mairs, London; Alex J. Pollitt, London, all of United Kingdom

[73] Assignees: Microsoft Corp., Redmond, Wash.; Picturetel Corp., Danvers, Mass.

[21] Appl. No.: 08/815,093

[22] Filed: Mar. 12, 1997

[51] Int. Cl.[6] ............................. G06F 15/16; G06F 13/00
[52] U.S. Cl. ........................... 395/200.43; 395/200.57
[58] Field of Search ..................... 395/200.57, 200.58, 395/200.43

[56] References Cited

U.S. PATENT DOCUMENTS

| | | | |
|---|---|---|---|
| 4,882,687 | 11/1989 | Gordon | 345/435 |
| 5,206,934 | 4/1993 | Naef, III | 395/200.34 |
| 5,210,825 | 5/1993 | Kavaler | 345/116 |
| 5,255,361 | 10/1993 | Callaway et al. | 345/522 |
| 5,408,600 | 9/1991 | Garfinkel et al. | 165/110 |
| 5,548,727 | 8/1996 | Meehan | 395/200.57 |
| 5,557,798 | 9/1996 | Skeen et al. | 705/35 |
| 5,565,886 | 10/1996 | Gibson | 345/136 |
| 5,583,993 | 12/1996 | Foster et al. | 395/200.58 |
| 5,621,894 | 4/1997 | Menezes et al. | 395/200.57 |
| 5,644,715 | 7/1997 | Baugher | 395/200.58 |
| 5,673,394 | 9/1997 | Fenwick et al. | 395/682 |
| 5,680,549 | 10/1997 | Raynak et al. | 395/200.57 |

OTHER PUBLICATIONS

"A Primer on the T.120 Series Standard," *DataBeam Corporation*, pp. 1–13, 1995.

Schroeder, Erica, "Videoconferencing—Creative brings Mac package to Windows," *PC WEEK*, vol. 11, No. 25, pp. 83 & 88, Jun. 27, 1994.

Intel Corporation, "Intel ProShare™ Personal Conferencing Software—Getting Started Guide," Chapter 4, pp. 25–31, 1994.

Schroeder, Erica, "PictureTel Plans Low–Cost Video App Sharing," *PC Week*, vol. 11, No. 25, pp. 1 & 171, Jun. 27, 1994.

*Primary Examiner*—Krisna Lim
*Attorney, Agent, or Firm*—Seed & Berry LLP

[57] ABSTRACT

A method and system for sharing application programs between multiple computer systems. In one embodiment, the present invention comprises a multipoint application sharing (MAS) system that resides at each computer system (i.e., node) in a network of computer systems. The MAS system at each computer system communicates with each MAS system at each other computer system by sending messages over the network. The MAS system enables a user at each computer system to share one or more application programs with each user at each other computer system. To share an application program, a user at a host computer system invokes the application program. Then, the user requests the MAS system to share the invoked application program with users at other computer systems. Each computer that is sharing the application, can view the output of the application and can, under certain circumstances, take control of the application so that it can send remote keyboard and pointing device information to the application.

23 Claims, 6 Drawing Sheets

METHOD AND SYSTEM FOR NEGOTIATING CAPABILITIES WHEN SHARING AN APPLICATION PROGRAM WITH MULTIPLE COMPUTER SYSTEMS

TECHNICAL FIELD

The present invention relates generally to a computer method and system for sharing an application program and, more specifically, to a method and system for sharing an application program with multiple computer systems.

BACKGROUND OF THE INVENTION

The modern workplace is increasingly reliant on the use of networks. A network is a group of computer systems and associated devices that are connected by communications facilities. A network enables the transfer of electronic information between computer systems. Typically, each of the computer systems has local application programs which can be invoked at that computer system. Also, each local application program displays output at that computer system.

Some computer systems allow a user at a host computer system to share an application program (i.e., a shared application program) with one other user at one other computer system (i.e., a shadow computer system). However, it would be useful for a user to be able to share an application program invoked at a host computer system with other users at multiple shadow computer systems. An application program is shared by executing the application program on the host computer system, by displaying the output of the application program (i.e., output data) on the display of the shadow computer system, and by receiving input for the application program from the host computer system and the shadow computer system.

For example, an editor who is working with an editorial staff to publish a newspaper can benefit from sharing an application program that generates a word processing document. In particular, the contents of the newspaper can be stored as a word processing document, and the editor can edit the format of each page of the word processing document at the editor's computer system and allow the members of the editorial staff to view the word processing document at their computer systems. The editor can share the word processing program with each staff member. The members of the editorial staff can view the changes made by the editor and provide input to the word processing program to modify the document based on the editor's revisions. Immediately, the editor can review these modifications to the document.

Additionally, when a user at a host computer system is sharing an application program with one other user at a shadow computer system, it is useful for the user at the shadow computer system to view an accurate representation of the output of the application program displayed at the host computer system. To enable the shadow computer system sharing the application program to display an accurate representation of this output data, each computer system exchanges capabilities which indicate how input data to an application program is to be processed and how output data from an application program is to be displayed. The capabilities include, for example, pixel depth, desktop size, order formats, font data, and palette data. Upon receiving the capabilities of the other computer system, a computer system identifies sharing capabilities that are capabilities that both computer systems support.

When a user at a host computer system starts sharing an application program with another user at a shadow computer system, the users initially exchange capabilities. Then, each computer system identifies sharing capabilities which represent the capabilities that both computer systems support. Both computer systems process and display output data using the sharing capabilities so that the output data displayed at the shadow computer system accurately represents the output data displayed at the host computer system.

When users at multiple computer systems are sharing an application program, it would be useful for each user to see an accurate representation of the output of the application program at the host computer system. It would also be useful for a user at a new computer system to join in sharing the application program. Moreover, it would be useful for a user at a computer system which is already sharing an application program to stop sharing the application program, while users at other computer systems continue to share the application program. As a user joins in sharing or stops sharing the application program, it would be useful for each user to continue to see an accurate representation of the output of the application program at the host computer system. Because the sharing capabilities can change as a user joins in sharing or stops sharing the application program, when users at multiple computer systems sharing an application program exchange capabilities only initially, as when only two computer systems are sharing an application program, the output data displayed at the host computer system cannot be accurately represented at each other computer. It would be useful to be able to identify the appropriate sharing capabilities to be used at each computer system sharing the application program when users join in or stop sharing the application program to ensure that the output data displayed at the shadow computer system accurately represents output data displayed at the host computer system.

SUMMARY OF THE INVENTION

The present invention provides several techniques for coordinating the sharing of an application with multiple computer systems. The computer systems negotiate capabilities in a application sharing conference. Each computer system in the conference has capabilities with capability values. To negotiate capabilities, each computer system advertises its capability values to each other computer system. Each computer system uses a predefined algorithm to determine sharing capabilities. Each computer system independently sets the negotiated capability values to the same set of values. In particular, when a capability is designated as being negotiated according to a one capability rule, each computer system sets the capability value for the capability to the advertised capability value of a specified computer system. When a capability is designated as being negotiated according to a max capability rule, then each computer system determines candidate capability values from the advertised capability values. Each computer system then sets the capability value for the capability to the maximum of all the determined candidate capability values. When a capability is designated as being negotiated according to a min capability rule, each computer system determines candidate capability values from the advertised capability values. Each computer system then sets the capability value for the capability to the minimum of all the determined candidate capability values.

In another aspect, the present invention provides a method for coordinating the exchange of data of computer systems that are sharing an application. Each computer system maintains a local share identifier. When a computer system is inactive in the sharing of the application, the computer system sets its local share identifier to invalid. When a computer system is to become active in the sharing of the application, the computer system generates a share identifier. The computer system then sets the local share identifier to the generated share identifier and sends the generated share identifier along with a demand to become active. When a computer system receives a demand to become active, if the local share identifier is invalid, the computer system sets the local share identifier to the share identifier received with the demand to become active. Otherwise, the computer system sets the local share identifier to the greater of the local share identifier and the share identifier received with the demand to become active. When a computer system is to confirm a demand to become active, the computer system sends the local share identifier along with a confirmation to become active. When a computer system receives a confirmation to become active, if the local share identifier is invalid, the computer system sets the local share identifier to the share identifier received with the confirmation to become active. Otherwise, the computer system sets the local share identifier to the greater of the local share identifier and the share identifier received with the confirmation to become active. When a computer system sends data to another computer system, the computer system sends the local share identifier along with the data. Finally, when a computer system receives data sent from another computer system, the computer system disregards the data when the local share identifier does not match the share identifier that is sent with the data.

DETAILED DESCRIPTION OF THE INVENTION

Figure 1:
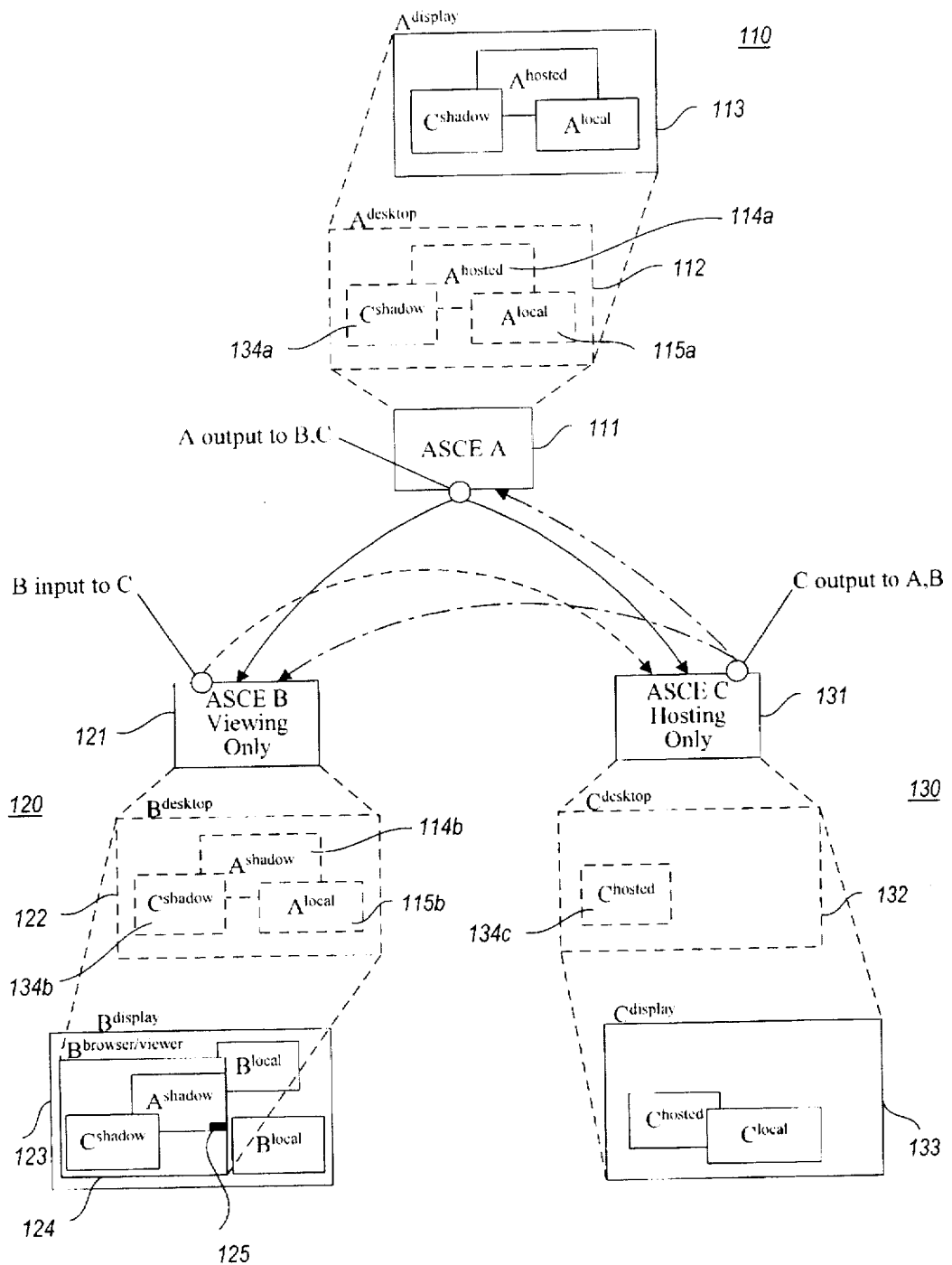
FIG. 1 is a block diagram illustrating a group of ASCEs within an AS session.

The present invention provides a method and system for sharing application programs between multiple computer systems. In one embodiment, the present invention comprises a multipoint application sharing (MAS) system that resides at each computer system (i.e., node) in a network of computer systems. The MAS system at each computer system communicates with each MAS system at each other computer system by sending messages over the network. The MAS system enables a user at each computer system to share one or more application programs with each user at each other computer system. To share an application program, a user at a host computer system invokes the application program. Then, the user requests the MAS system to share the invoked application program with users at other computer systems. Each computer that is sharing the application, can view the output of the application and can, under certain circumstances, take control of the application so that it can send remote keyboard and pointing device information to the application.

The present invention also provides a technique that allows the computer systems that are sharing the application to exchange capabilities so that each computer system can display an accurate representation of the output of the shared application. Each computer system broadcasts to each other computer system the capabilities that it supports. Once a computer system receives the capabilities of all the other computer systems, it calculates a set of shared capabilities. Since each computer system uses the same predefined algorithm to determine the shared capabilities, the calculated set is the same for each computer system. When a computer system joins in or leaves the sharing of the application, each computer system again recalculates the capabilities including or omitting the capabilities of the joining or leaving application. Thus, each computer system can calculate the shared capabilities without the need for a complex communications scheme.

The present invention also uses a share identifier and a control identifier to coordinate the exchange of data and the control of the application. As computer systems join in and leave the sharing of an application, the share identifier is updated by each computer system. Thus, each computer system maintains a local version of the share identifier. When data is exchanged, the share identifier is included with the data. Thus, when a computer system receives data with a share identifier that does not match the current share identifier, it disregards the data. In this way, the computer system can ensure that data generated based on the capabilities of computer systems that have already left the share are disregarded. The control identifier helps to indicate which computer system is currently "in control" of the shared application. An application that is in control can input data to the application. When a computer system requests control or when the computer system that is in control stops sharing, then the computer systems exchange the control identifier to uniquely identify the next computer system to take control.

The MAS system implements an application sharing ("AS") protocol that enables the multipoint computer application sharing. The MAS system includes an application sharing conference entity ("ASCE"), a local multipoint communication service ("MCS"), and a local generic conference control ("GCC"). An ASCE interacts with the application and the local MCS and GCC to effect the application sharing via the AS protocol. A group of computers that are sharing one or more applications are in an "application sharing session" or a "conference." The ASCEs of the computers in an AS session exchange data using AS protocol data units ("ASPDU"). The AS protocol defines interactions between ASCEs.

The AS protocol does not assume or require any particular type of local computer, nor does it assume or require a particular local window manager or windowing model. The AS protocol, however, does define a virtual desktop and a window model consisting of a collection of windows on a desktop. Each active ASCE within an AS session is responsible for mapping local terminal environment concepts to and from the virtual desktop and window model. The virtual desktop is a rectangle defined in virtual desktop coordinates. The virtual desktop is the union of sizes of the desktops of hosting ASCEs (i.e., ASCEs that are hosting windows). An AS window is a rectangle defined in virtual desktop coordinates and may be wholly within, partially within, or wholly outside the virtual desktop.

FIG. 1 is a block diagram illustrating a group of ASCEs within an AS session. Computers 110, 120, and 130 are participating within an AS session. Each computer has an ASCE that maintains a corresponding virtual desktop 112, 122, 132, and that displays data on a display 113, 123, 133. ASCE A 111 and ASCE C 131 are each hosting an application that is shared with the other ASCEs. ASCE A is sharing its application with ASCE B 121, and ASCE C is sharing its application with both ASCE A and ASCE B. ASCE A is operating in full function mode, that is, it is hosting an application and sharing the window 114a of that hosted application with the other ASCEs in the session. ASCE A is also displaying a shadow window 134a shared from other ASCEs (i.e., "viewing"). ASCE B is operating in viewing only mode, that is, it displays shadow windows shared from other ASCEs, but does not itself share windows in the AS session. ASCE C is operating in hosting only mode, that is, it shares windows into the AS session, but does not display shadow windows.

Within an AS session, windows can be hosted, shadow, or local. Hosted windows are controlled by an application executing on the local computer and are shared in an AS session. For each hosted window, there is a corresponding shadow window that is displayed by each ASCE that is viewing. Shadow windows are displayed by the ASCE and correspond to a hosted window on the host ASCE. Local windows are not shared, that is their output is only displayed on the local computer. An ASCE tracks a local window when it obscures a hosted window and the ASCE cannot obtain valid drawing information for the discussed portion of the hosted window.

As shown in FIG. 1, ASCE A is managing three windows: a shadow window 134a, a hosted window 114a, and a local window 115a. The shadow window 134a corresponds to the window 134c hosted by ASCE C. The hosted window 114a is shared in the AS session. The ASCE A manages the local window 115a because it obscures the hosted window and valid drawing information for the discussed portion of hosted window cannot be obtained. The shadow window 134a is displayed by ASCE A and the other two windows are displayed by the local computer 110. ASCE B is also managing three windows: two shadow windows 114b and 134b and a local window 115b. One shadow window 114b corresponds to the hosted window 114a of ASCE A and the other shadow window 134b corresponds to the hosted window 134c of ASCE C. ASCE B also manages the local window 115b corresponding to the local window 115a of ASCE A because that local window obscures the hosted window 114a of ASCE A and valid data for the obscured portion of the hosted window cannot be obtained by ASCE A. ASCE B does not track the local windows of its computer because ASCE B does not host any windows so there is no possibility of a hosted window being obscured. ASCE B is executing on a computer where the AS desktop is mapped into an independently sizable browser/viewer window 124. The browser/viewer window is shown as smaller than the AS desktop and thus is scrolled to view the entire AS desktop. Shadow windows 114b and 134b are currently displayed in the browser/viewer window by ASCE B. However, ASCE B does not display the local window 115b. Rather, ASCE B uses the local window 115b to compute and display an obscured area, which partially obscures shadow window 114b as shown by the shaded portion 125 in the browser/viewer window for which ASCE A cannot obtain valid data. ASCE C is managing one window: a hosted window 134c. ASCE C does not track the shadow window corresponding to the hosted window of the ASCEs because ASCE C does not view shadow windows. ASCE C also does not track its local window even though it obscures the hosted window. The tracking of the local windows is unnecessary because the local computer allows ASCE C to obtain valid data for even the obscured portion of a hosted window.

When an ASCE is hosting a window, it is responsible for constructing and sending an output stream that will allow other ASCEs to faithfully display the corresponding shadow windows. The output stream is broadcast to all other active ASCEs within the AS session. If an ASCE is hosting only, then it can ignore some or all of the output streams. Similarly, a receiving ASCE may decide to display only a subset of the output stream (e.g., only display windows from a particular ASCE). An ASCE determines the allowable commands for an output stream based on the current negotiated capabilities. The current capabilities are renegotiated as ASCEs with higher or lower capabilities join or leave an AS session. The negotiation of the capabilities is described below in detail.

Within an AS session, control of input to a shared application is managed via a combination of conductorship, a core control protocol, and a mediated control protocol defined by the AS protocol. When the conductorship is used, then the AS core and mediate protocols are not used. Otherwise, the AS core and mediated protocols are used. In each of these control schemes, one ASCE at a time with an AS session is in control and has the right to provide input to hosted or shadow windows.

When an ASCE is in control, the ASCE determines whether local input events are for a local, hosted, or shadow window. When the event is for a local or hosted window, then the ASCE can defer processing of the event to the local computer. When the event is for a shadow window, then the ASCE determines which ASCE hosts the corresponding hosted window and constructs a suitable output stream for that hosting ASCE. The AS output stream consists of interleaved keyboard and pointing device events. When the hosting ASCE receives the output stream, it forwards the keyboard and pointing device events to the shared application, which processes the events as if they were input directly at the hosting computer.

All communications for application sharing are preferably in accordance with the multipoint communication services ("MCS") as specified by the International Telecommunications Union ("SITU") open standard T.120. However, one skilled in the art would appreciate that other communications services can be used in conjunction with the present invention. Although terminology used in this description may be consistent with various standards, the principles of the present invention are not dependent upon such standards. MCS applications (e.g., ASCEs) direct data within the conference via the use of channels. An MCS application a can choose to use multiple channels simultaneously for whatever purpose it needs. MCS applications choose to obtain information by subscribing to whichever channel contains a desired data. Channels can either be private channels or broadcast channels. A broadcast channel is used to send information to each computer in a conference, whereas a private channel is used to direct information to a subset of the computers in the conference.

An ASCE uses the MCS service primitives described in Table 1 to attach and detach from a conference, join and leave the channel of an AS session, and send application sharing protocol data units ("ASPDU").

TABLE 1

MCS primitives used by an ASCE

| MCS primitive | Description |
| --- | --- |
| MCS-ATTACH-USER | Creates an MCS attachment through an MCS SAP to a domain hosted by the MCS provider. A result is confirmed to the requester. If the request is accepted, a user ID is assigned. |
| MCS-DETACH-USER | Deletes an MCS attachment that was created previously by invocation of MCS-Attach-User. This primitive may be requested by a user or initiated by a provider. It delivers an indication at every other MCS attachment to the same domain. If provider initiated, an indication is also delivered at the deleted attachment. |
| MCS-CHANNEL-JOIN | Used by an application client to join an appropriate channel whose use is defined by the application. This is a prerequisite for receiving data sent to the channel. |
| MCS-CHANNEL-LEAVE | Used by an application client to leave a previously joined channel and thus stop receiving data sent to that channel. The primitive may be user initiated (request only) or provider initiated (indication to affected user only). |
| MCS-SEND-DATA | Used to transmit data to other members of a domain. If the sender is a member of the destination channel, it will not receive its own data indications. However, it will receive data indications from other sources addressed to that channel. |

MCS request primitives are directed from the ASCE to the MCS, while indication primitives are directed from the MCS towards the ASCE. Table 2 describes the MCS channel usage for AS sessions of types defined by the ITU-T recommendation T.121. The application registry resource ID shown in the table 2 is used for allocating dynamic channels.

TABLE 2

Description of AS Channels

| Mnemonic | Channel IDs for Static Channel | Application Registry Resource IDs for Dynamic Channels | Description |
| --- | --- | --- | --- |
| AS-{MCS-USER-ID}-CHANNEL | — | — | Certain ASPDUs are sent directly to individual ASCEs. To do this, the individual MCS-USER-ID channels of the peer ASCEs in the MCS domain are used. |
| AS-CHANNEL | AS-CHANNEL-0 | "421" | This channel bears all ASPDUs to be broadcast to all peer ASCEs in a domain. |

Table 3 lists the use of MCS data service MCS-SEND-DATA for each ASPDU. ASPDUs are placed in the data parameter of the MCS-SEND-DATA primitive. The ASPDUs are packed into the sequence of octets that form the data parameter such that the leading bit is placed in the most significant bit of each octet and filled towards the least significant bit of each octet.

TABLE 3

Use of MCS Data Primitives for ASPDUs

| ASPDU | Channel |
| --- | --- |
| ApplicationPDU | AS-CHANNEL or AS-{MCS-USER-ID}-CHANNEL |

TABLE 3-continued

Use of MCS Data Primitives for ASPDUs

| ASPDU | Channel |
| --- | --- |
| ConfirmActivePDU | AS-CHANNEL |
| ControlPDU | AS-CHANNEL |
| DeactivateAllPDU | AS-CHANNEL |
| DeactivateOtherPDU | AS-{MCS-USER-ID}-CHANNEL |
| DeactivateSelfPDU | AS-CHANNEL |
| DemandActivePDU | AS-CHANNEL |
| FlowResponsePDU | AS-{MCS-USER-ID}-CHANNEL |
| FlowStopPDU | AS-CHANNEL |
| FlowTestPDU | AS-CHANNEL |

TABLE 3-continued

Use of MCS Data Primitives for ASPDUs

| ASPDU | Channel |
|---|---|
| FontPDU | AS-CHANNEL |
| InputPDU | AS-CHANNEL |
| MediatedControlPDU | AS-CHANNEL |
|  | or AS-{MCS-USER-ID}-CHANNEL |
| PointerPDU | AS-CHANNEL |
| RemoteSharePDU | AS-{MCS-USER-ID}-CHANNEL |
| RequestActivePDU | AS-{MCS-USER-ID}-CHANNEL |
| SynchronizePDU | AS-CHANNEL |
| UpdateCapabilityPDU | AS-{MCS-USER-ID}-CHANNEL |
| UpdatePDU | AS-CHANNEL |
| WindowActivationPDU | AS-CHANNEL |
|  | or AS-{MCS-USER-ID}-CHANNEL |
| WindowListPDU | AS-CHANNEL |

TABLE 4

Example Capability Negotiation

| ACSE 1 | | | | | | |
|---|---|---|---|---|---|---|
| Class | Value | one→2 | min(C) | min(NC) | max(C) | max(NC) |
| B | T | F | F | F | T | F |
| F | x0001 | x0003 | n/a | x0003 | n/a | x0003 |
| N | 100 | 300 | 100 | 300 | 300 | 300 |

| ACSE 2 | | | | | | |
|---|---|---|---|---|---|---|
| Class | Value | 1←one | min(C) | min(NC) | max(C) | max(NC) |
| B | F | T | F | T | T | T |
| F | x0003 | x0001 | n/a | x0001 | n/a | x0001 |
| N | 300 | 100 | 100 | 100 | 300 | 300 |

The MAS system also uses the facilities of the generic conference control (GCC) as specified by ITU-T recommendation T.124. GCC provides facilities for establishing a multipoint conference. The GCC provides the capability to create, join, and send invitations for conferences. The GCC manages a database of information describing the current participants in the conference. Every application and conference has a unique application key. The GCC provides facilities for the applications to exchange capabilities and negotiate. The AS protocol uses a Non-standard Base Session in accordance with the ITU-T recommendation T.121 and the Application Protocol Key.

Capabilities

The AS capabilities are collected into capability sets of related individual capabilities. An ASCE may define non-standard capability extensions by adding private capability sets and by adding private capabilities at the end of defined capability sets. An ASCE advertises its combined capabilities during ASCE activation using the following ASPDUs: DemandActivePDU, RequestActivePDU, and ConfirmActivePDU. An ASCE advertises a change in a particular capability set using the UpdateCapabilityPDU. The AS protocol defines how capabilities of the computers are to be negotiated. The ASCE activation ASPDU exchanges ensure that an ASCE has a copy of each others ASCEs capabilities. In addition, an ASCE is responsible for performing all capability negotiations.

The AS protocol defines four capability negotiation rules: one, info, min, and max. For the one negotiation rule, the negotiated capability value is the value advertised by a particular ASCE. For the info capability negotiation rule, the information is provided solely for informational purposes. When the capability negotiation rule is min or max, then an ASCE processes the advertised capability based upon the number of candidate values. The candidate values correspond to the value advertised by each active ASCE excluding the value advertised by the ASCE performing the negotiation. Thus, the candidate value is one less than the number of active ASCEs.

When all ASCEs advertised values and the number of candidate values is greater than one, then the ASCE applies the defined min or max capability negotiation rule.

Table 4 illustrates an example of the negotiation of capabilities between two ASCEs. Each row shows the capability negotiation for ASCE 1 and ASCE 2 for a certain class (e.g., "B"-logical, "F"-bit flags, and "N"-integer) of capability value. For example, the first row for class "B" shows that ASCE 1 advertises the value "T" and ASCE 2 advertises the value "F." If the capability negotiation rule is one and indicates that the value of ASCE 2 is to be used, then the negotiated capability is "F." When the capability negotiation rule is max and both ASCEs advertise using a collapsing capability ("max(C)"), then the negotiated capability for ASCE 1 and ASCE 2 is "T." When the capability negotiation rule is max and both ASCEs advertising using a non-collapsing capability ("max(NC)"), then the negotiated capability for an ASCE is the maximum of all advertised capabilities excluding its own. Thus, the negotiated capability value of ASCE 1 is "F" and for ASCE 2 is "T."

Figure 2:
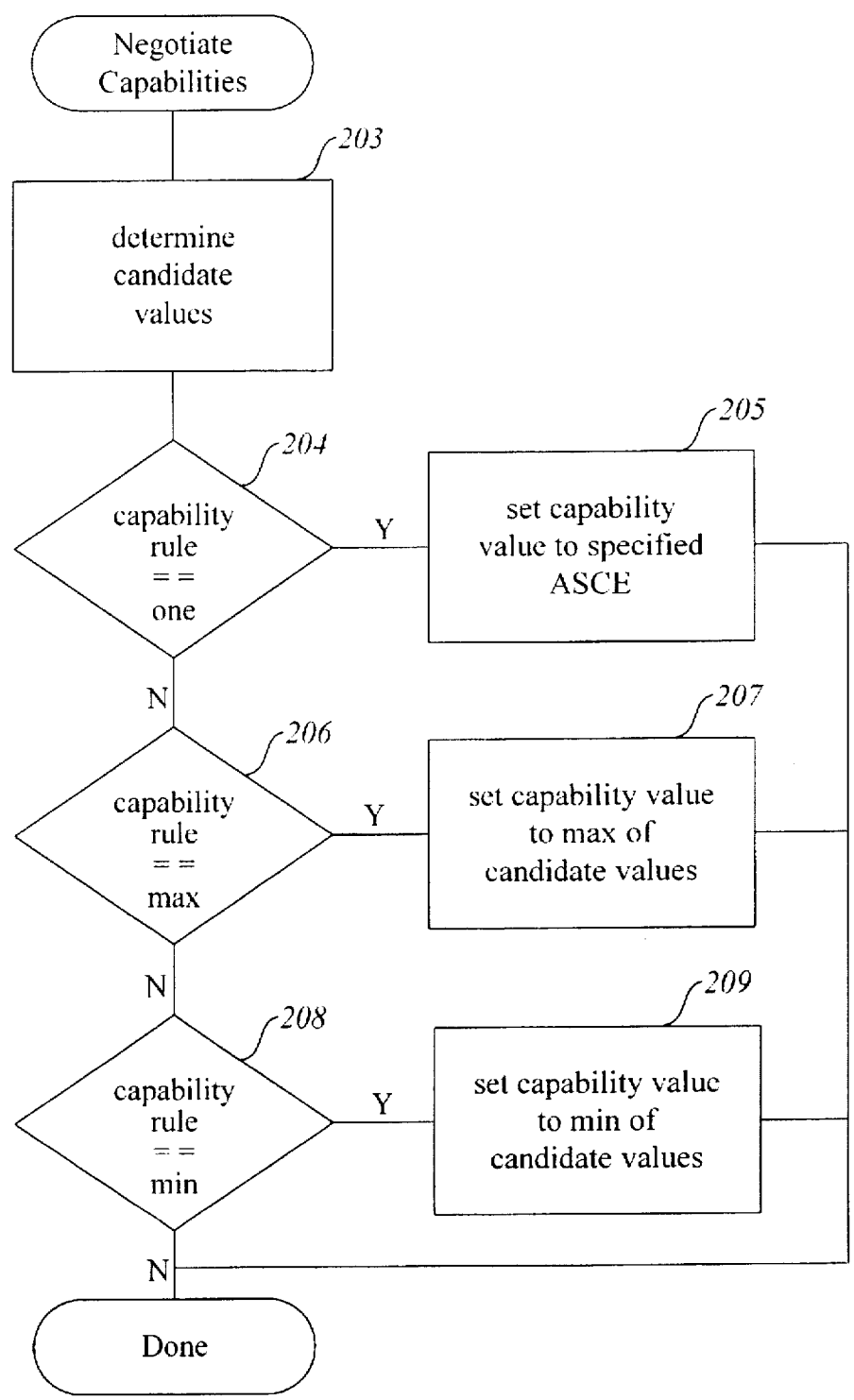
FIG. 2 is a flow diagram illustrating the negotiations of the capabilities.

FIG. 2 is a flow diagram of a routine for negotiating capabilities. Each ASCE performs this negotiation as ASCEs join and leave the sharing of the application or change their capabilities. In step 203, the routine determines the candidate values. In step 204, if the capability rule is one, then the routine continues at step 205, else the routine continues at step 206. In step 205, the routine sets the capability value to the value indicated by the specified ASCE and is done. In step 206, if the capability rule is equal to max, then the routine continues at step 207, else the routine continues at step 208. In step 207, the routine sets the capability value to the maximum of the candidate capability values and is done. In step 208, if the capability rule is equal to min, then the routine continues at step 209, else the routine is done. In step 209, the routine sets the capability value to the minimum of the candidate values and is done.

Activation

Within an AS session, an ASCE may be in one of three activation states: inactive, pending active, and active. An inactive ASCE is not participating in the sharing of windows. When an ASCE is inactive, it need not retain local resources that are required for hosting or sharing. A pending active ASCE is in the process of becoming active and is not participating in the sharing of windows. An active ASCE is participating with other active ASCEs and sharing windows. When an ASCE activates or deactivates, a share identifier is used to uniquely identify the set of ASCE currently active. The ASCEs use the share identifiers to determine which protocol data units are valid for the currently active set of ASCEs. Because of delays in the network, a protocol data unit may be received that was generated for a different set of ASCEs than are currently active. Such a protocol data unit may contain data that is inconsistent with the currently negotiated set of capabilities. Thus, such a protocol data unit should be disregarded. The share identifier is used to identify such outdated protocol data units.

An ASCE joins an AS Non-standard Base Session using the GCC-Application-Enroll request. This does not make the ASCE active, but does ensure that the ASCE is visible to other ASCEs within the conference. An ASCE may remain enrolled in the Non-standard Base Session over a period while moving from inactive to active state and back again a number of times. This distinction, between enrollment and activation, enables an ASCE to defer the commitment of application-specific resources to the point within the conference where application sharing is actually taking place.

An ASCE that wishes to become active sends either a DemandActivePDU or a RequestActivePDU to all ASCEs within the conference. An ASCE preferably sends a RequestActivePDU to all ASCEs within the conference to determine if there are other active ASCEs in the AS session. If no active ASCEs respond to the RequestActivePDU, then the ASCE sends a DemandActivePDU to all ASCEs when it wishes to start sharing. A DemandActivePDU includes a unique share identifier (described below). On receipt of a DemandActivePDU, an ASCE may send a ConfirmActivePDU to all ASCEs within the conference. An inactive ASCE is not required to respond to a DemandActivePDU. If an inactive ASCE responds to a DemandActivePDU, then it enters the active state. If an ASCE is already active, then on receipt of a RequestActivePDU, it sends a ConfirmActivePDU to all ASCEs within the conference.

To deactivate another active ASCE, an ASCE sends a DeactivateOtherPDU to the ASCE that is to be deactivated. On receipt of the DeactivateOtherPDU, the ASCE becomes inactive. ASCEs typically only issue deactivate other PDUs when it has received DemandActivePDU, RequestActivePDU, or ConfirmActivePDU with capabilities that would seriously affect the successful progress of the application sharing within the conference. An ASCE may deactivate all active ASCEs by sending a DeactivateAllPDUs to all ASCEs within the conference. When an ASCE determines that there are no other active ASCEs within the session, it becomes inactive. When an ASCE becomes inactive it sends a DeactivateSelfPDU to all ASCEs within the conference.

Figure 3:
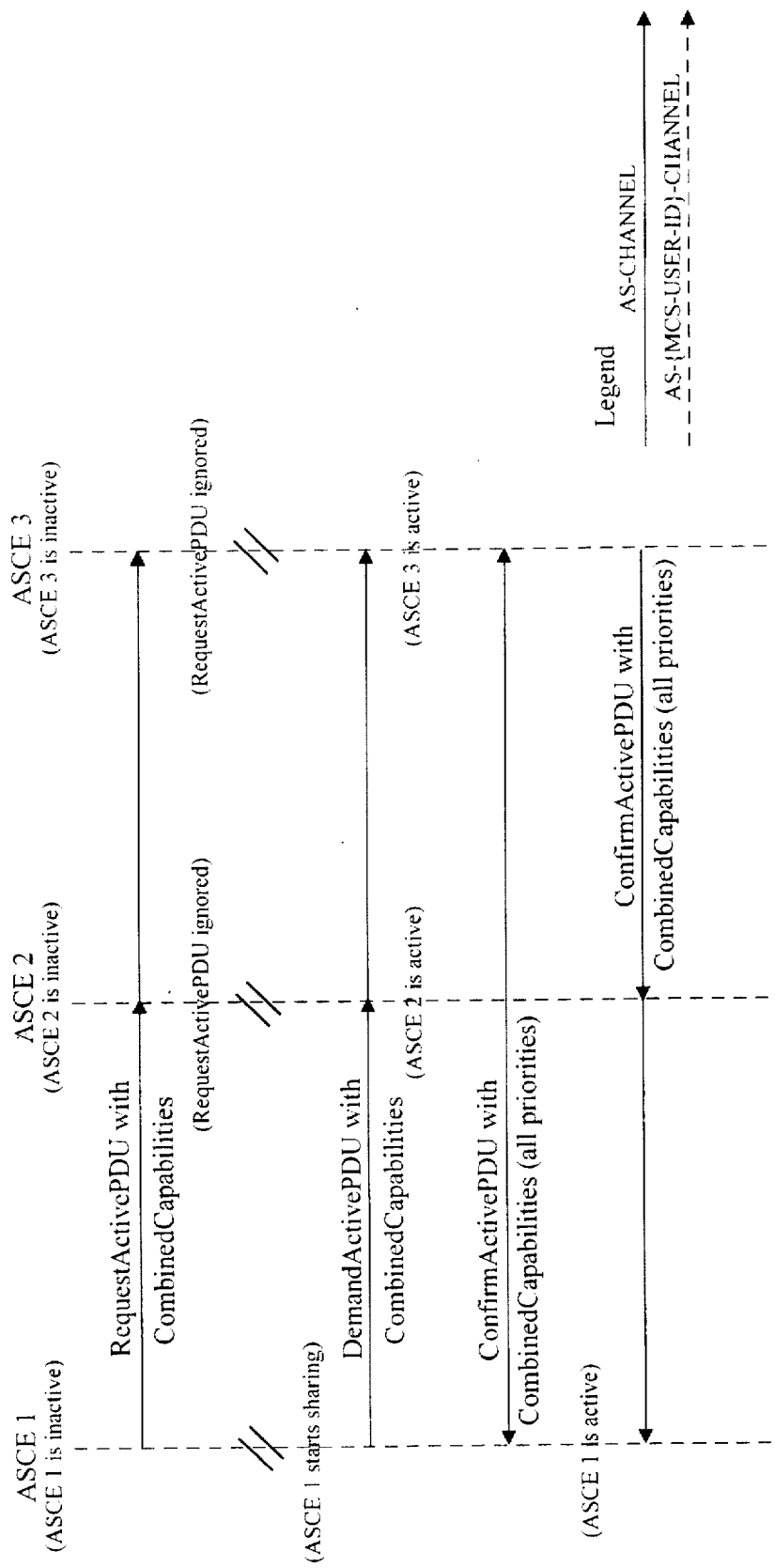
FIGS. 3 and 4 illustrate the activation and deactivation of ASCEs.
Figure 4:
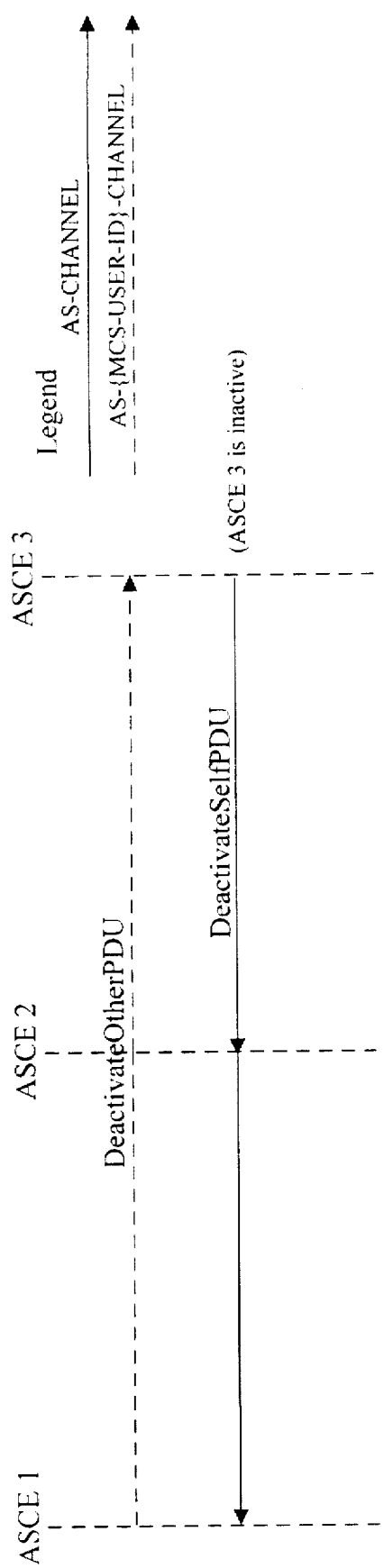

FIGS. 3 and 4 illustrate the activation and deactivation of ASCEs. As shown in FIG. 3, ASCE 1 initially sends a RequestActivePDU along with its capabilities to ASCE 2 and ASCE 3. Since neither ASCE 2 nor ASCE 3 is active, they do not respond. When ASCE 1 eventually starts sharing, it sends a DemandActivePDU along with its capabilities. When ASCE 2 and ASCE 3 receive the message, they become active and send with a ConfirmActivePDU along with their capabilities. Each ASCE, thus, receives the capabilities of each other ASCE and can negotiate the capabilities as appropriate. As shown in FIG. 4, ASCE 1 instructs ASCE 3 to deactivate by sending a DeactivateOtherPDU. ASCE 3 deactivates and notifies other ASCEs by sending a DeactivateSelfPDU.

Tables 5–11 contain descriptions of the ASPDU relating to activation.

TABLE 5

DemandActivePDU

| Parameter | Description |
| --- | --- |
| ShareControl Header | |
| ShareID | This parameter is the proposed share identifier for use within the AS session. |
| SourceDescriptor | This parameter is a null-terminated text string identifying this ASCE suitable for display to an end-user. |
| CombinedCapabilities | This parameter is a list of this ASCE's combined capabilities, which contains one copy of each of the capability sets in any order. |

TABLE 6

RequestActivePDU

| Parameter | Description |
| --- | --- |
| ShareControl Header | |
| SourceDescriptor | This parameter is a null-terminated text string identifying this ASCE suitable for display to an end-user. |
| CombinedCapabilities | This parameter is a list of this ASCE's combined capabilities, which contains one copy of each of the capability sets in any order. |

TABLE 7

ConfirmActivePDU

| Parameter | Description |
| --- | --- |
| ShareControl Header | |
| ShareID | This parameter is the current share identifier in use within the AS session. |
| OriginatorID | This parameter is the MCS User ID of the ASCE that issued the DemandActivePDU or RequestActivePDU to which this is a response. This enables an ASCE receiving this ConfirmActivePDU to correlate it with a previous DemandActivePDU or RequestActivePDU. |

TABLE 7-continued

ConfirmActivePDU

| Parameter | Description |
|---|---|
| SourceDescriptor | This parameter is a null-terminated text string identifying this ASCE suitable for display to an end-user. |
| CombinedCapabilities | This parameter is a list of this ASCE's combined capabilities, which contains one copy of each of the capability sets in any order. |

TABLE 8

DeactivateOtherPDU

| Parameter | Description |
|---|---|
| ShareControl Header | |
| ShareID | This parameter is the current share identifier in use within the AS session. |
| DeactivateID | This parameter is the MCS User ID of the ASCE to be deactivated. |
| SourceDescriptor | This parameter is a null-terminated text string identifying this ASCE suitable for display to an end user. |

TABLE 9

DeactivateSelfPDU

| Parameter | Description |
|---|---|
| ShareControl Header | |
| ShareID | This parameter is the current share identifier in use within the AS session. |

TABLE 10

DeactivatAllPDU

| Parameter | Description |
|---|---|
| ShareControl Header | |
| ShareID | This parameter is the current share identifier in use within the AS session. |
| SourceDescriptor | This parameter is a null-terminated text string identifying this ASCE suitable for display to an end-user. |

TABLE 11

ShareControl Header

| Parameter | Description |
|---|---|
| totalLength | This is the total length in octets of the ASPDU within which this header is included. This parameter is required as MCS implementations may segment ASPDUs in transmission and are not required to reassemble on delivery. This parameter allows receiving ASCEs to efficiently perform reassembly where MCS segmentation is present. |
| protocolVersion | This parameter identifies the protocol version supported by the issuing ASCE. The allowable value is 1. |
| PDUSource | This parameter is the MCS User ID of the ASCE sending the ASPDU containing this ShareControl Header. |

Share Identifiers

A share identifier is a 32-bit handle that is part of most ASPDUs. The share identifier is used by an ASCE to detect and ignore "late" data generated with respect to previous activations and capabilities within the AS session. Each ASCE constructs share identifiers locally. The share identifier consists of the MCS user ID of the ASCE and a monotonically increasing unsigned and wrapping counter. Each ASCE in a AS session maintains a local share identifier which is its view of the current share identifier in use within the system. When an ASCE is inactive or has issued a RequestActivePDU, it sets its local share identifier to a special invalid value. An ASCE generates a new proposed share identifier (by incrementing the counter of the previous share identifier) when issuing a DemandActivePDU and sets its local share identifier to that new identifier. An ASCE checks the share identifier of an incoming DemandActivePDU or ConfirmActivePDU against its local share identifier and updates its local share identifier. If its local share identifier is not valid, the ASCE sets its local share identifier to the share identifier of the incoming ASPDU. If its local share identifier is valid, the ASCE sets its local share identifier to the higher value of the two share identifiers.

Figure 5:
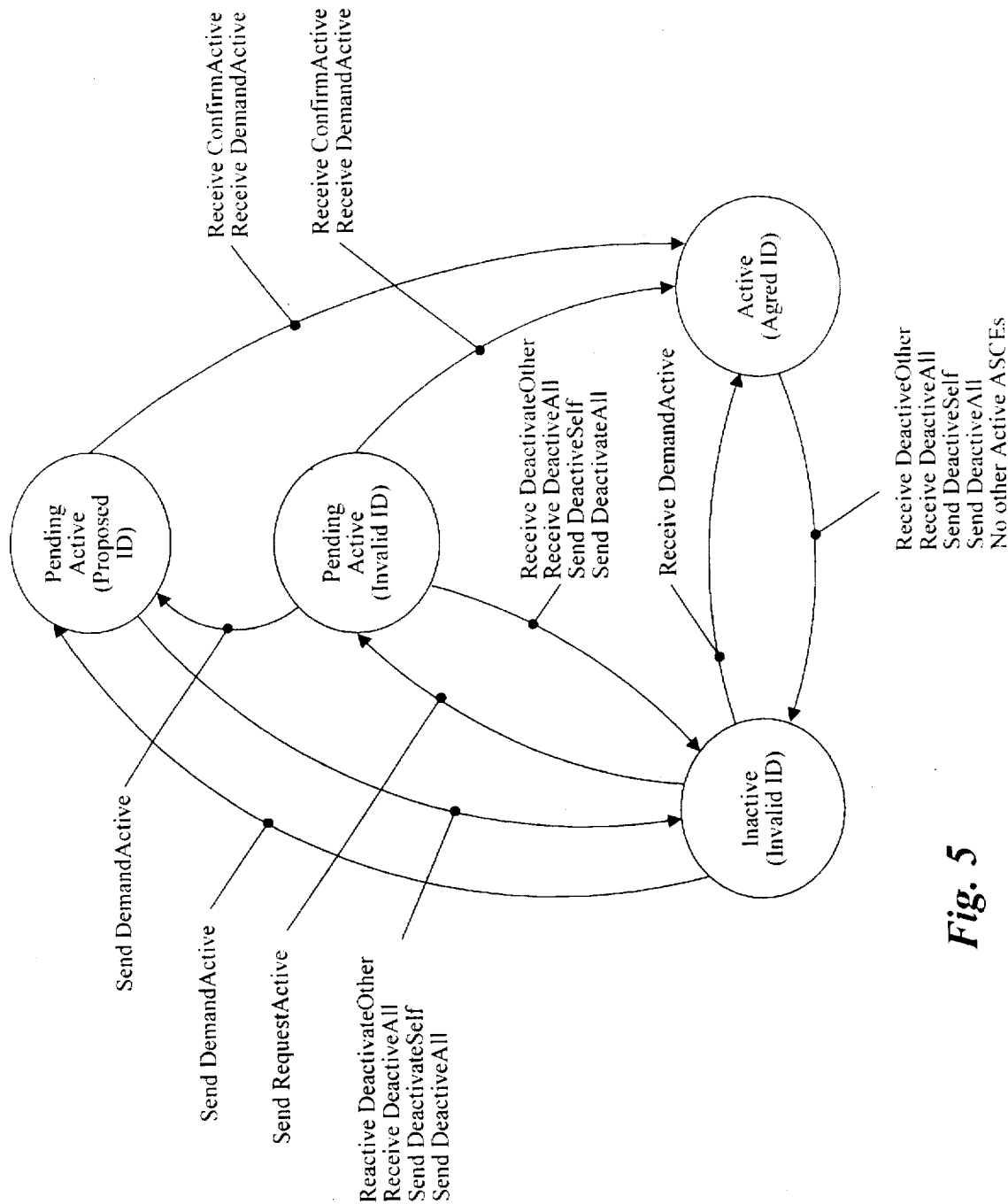
FIG. 5 is a phase diagram summarizing allowable transitions between ASCE states with respect to share identifier values.

Because share identifiers are formed by the combination of the MCS user ID and a local counter, the share identifier values cannot be equal. On receipt of a RequestActivePDU, an ASCE sets the share identifier value in a subsequent ConfirmActivePDU to its local share identifier. When issuing a DeactivateSelfPDU or DeactivateAllPDU, or on receipt of the DeactivateOtherPDU or DeactivateAllPDU, or when there is no other active ASCEs in the session, an ASCE sets its local share identifier to the special invalid value. On receipt of all of the ASPDUs containing a share identifier, an ASCE discards the ASPDU when the share identifier value does not match its local share identifier. FIG. 5 presents a phase diagram summarizing allowable transitions between ASCE states with respect to share identifier values.

Synchronization

When an ASCE is active within an AS session, certain events may require the ASCE to update protocol-related resources or to send ASPDUs which allow other ASCEs to perform complementary changes. The ASCE processing associated with these events is referred to as synchronization. The ASCE protocol defines four classes of synchronizations: ASCE, hosting, shadow, and input. Each synchronization class defines a related set of ASCE synchronization requirements associated with a particular range of session events. For example, hosting synchronization defines a set of synchronization requirements that apply to an ASCE that is hosting windows.

ASCE Synchronization

When an ASCE becomes active, it sets its control identifier to 0. The AS protocol does not require any specific synchronization when an ASCE becomes inactive.

When an active ASCE detects another ASCE has become inactive, it determines the negotiated capabilities for all active ASCEs within the AS session and uses these capabilities as the basis for constructing all subsequent data ASPDUs. Before sending any other data ASPDUs, the ASCE sends a SynchronizePDU on all outgoing streams to all ASCEs within the conference. The ASCE also marks all incoming streams for each other active ASCE as pending synchronization. Each incoming stream for each other active ASCE remains pending synchronization until the ASCE receives a SynchronizePDU. When synchronization is pending, the ASCE discards all incoming data ASPDUs on that particular stream. A particular SynchronizePDU is directed on a single stream from a particular other active ASCE but is sent on the AS-CHANNEL. Each SynchronizePDU includes the MCS user ID of the intended target ASCE, so that it can be discarded by ASCEs that are not the intended target. This mechanism ensures that the synchronized PDU arrives before any broadcast data of the target ASCE. The ASCE also discards its list of matched fonts, resets its count of received FontPDUs, and sends a FontPDU to readvertise its set of matchable fonts. The ASCE also sends either a CooperatePDU or DetachPDU to advertise its control state. If the ASCE is cooperating and has a control identifier, it sends a Grant Control ControlPDU. If the ASCE is hosting a window, it performs the hosting synchronization.

ASCE synchronization as a result of other ASCEs becoming active may generate significant local processing load and significant ASPDU traffic, especially where it also initiates host synchronization. When an ASCE detects that a number of other ASCEs have become active in the conference in close succession, it is preferable that the ASCE implements ASCE synchronization so that it defers some or all of the required synchronization for each newly active ASCE until a significant proportion or all of the ASCEs are active. However, the deferment should be time limited in proportion to the number of ASCEs in the group and some arbitrary maximum so that responsiveness to activation is maintained.

When another ASCE becomes inactive, an ASCE performs the following synchronization. If the local ASCE becoming inactive (because it is the only active ASCE remaining within the AS session), then no ASCE synchronization is required. When the ASCE that became inactive owned the control identifier, then each remaining active ASCE participates in an exchange of ControlPDUs to re-establish a single ASCE as the control identifier owner. When other ASCEs remain active, the local ASCE may re-determine the negotiated capabilities for all remaining active ASCEs within the AS session and use these capabilities as the basis for constructing all subsequent data ASPDUs. When other ASCEs remain active, the local ASCE may also re-match its list of matched fonts based on the font information received from the remaining active ASCEs. Tables 12 and 13 contain a description of the synchronizePDU.

TABLE 12

SynchronizePDU

| Parameter | Description |
|---|---|
| ShareData Header | |
| targetUser | This parameter is the MCS User ID of the ASCE to which this ASPDU is directed. Where an ASCE receives a SynchronizePDU containing a MCS User ID other than its own, it shall discard it. |

TABLE 13

ShareData Header

| Parameter | Description |
|---|---|
| ShareControl Header | |
| shareID | This parameter uniquely identifies the ASCE session within which this ASPDU is issued. |
| streamID | This parameter identifies the stream for this ASPDU. |
| uncompressedLength | This parameter is the length of the uncompressed ASPDU data in octets, starting from and including the generalCompressedType parameter. This parameter may be used as a check on |

TABLE 13-continued

ShareData Header

| Parameter | Description |
|---|---|
| | decompression. |
| generalCompressedType | This parameter indicates whether the issuing ASCE has general compressed the ASPDU containing this ShareData Header-and if so, indicates which general compression scheme type has been applied. Interpretation of this field depends on the negotiated General.generalCompressionLevel capability as follows:<br>• If the negotiated General.generalCompressionLevel capability is zero, then the ASCE shall only reference the most significant bit of this field.<br>• If the negotiated General.generalCompressionLevel capability is greater than zero, then the ASCE shall reference all bits within this field.<br>A value of zero indicates that no general compression has been applied. A non-zero value specifies the particular compression type that has been applied. |
| generalCompressedLength | Where the generalCompressedType is non-zero, this parameter is the length of the compressed ASPDU data in octets, starting from and including the generalCompressedType parameter. Where the generalCompressedType is zero, indicating that no general compression has been applied, this parameter shall be zero. |

Hosting Synchronization

Hosting synchronization is the set of synchronization operations that are associated with the hosting of windows. When an ASCE first starts hosting windows, when it is hosting windows and a new ASCE becomes active, or when it is hosting windows and a capability set is updated, it performs the following synchronization operations. The ASCE sends an UpdatePDU (Synchronization) to all ASCEs within the conference. The UpdatePDU (Synchronization) is sent before any other ASPDUs generated by the sending ASCE as a result of hosting synchronization and notifies other ASCEs that this ASCE is hosting windows. On receipt of a UpdatePDU (Synchronize), an ASCE shall perform any relevant shadow synchronization. The ASCE resets its sending color pointer cache. The ASCE resets its order encoding state, its sending bitmap cache, its sending colortable cache, and its sending desktop save cache. The ASCE sends an ApplicationPDU with action NotifyHostedApplications indicating the number of hosted applications on the local terminal, a WindowListPDU containing information on the current local window structure and a WindowActivationPDU providing information on the local window activation status. The ASCE queues a Desktop Origin order, which is sent in an UpdatePDU (Orders) ASPDU before any subsequent bitmap data or orders. The ASCE constructs an AS output stream, consisting of a mixture of bitmap data and/or orders, containing sufficient information to allow other ASCEs to draw shadow windows corresponding to its hosted windows. When an ASCE stops hosting windows, but remains active, it sends an ApplicationPDU with action NotifyHostedApplications indicating that zero applications are now hosted, to allow other ASCEs to perform any required shadow synchronization. Table 14 contains a description of the UpdatePDU (Synchronize).

TABLE 14

UpdatePDU (Synchronize)

| Parameter | Description |
|---|---|
| ShareData Header | |

Shadow Synchronization

Shadow synchronization is the set of synchronization operations that are associated with the drawing of shadow windows. When an ASCE receives an UpdatePDU (Synchronize) from another ASCE, it performs shadow synchronization with respect to that hosting ASCE. When an ASCE determines that a capability set has been updated, the ASCE performs shadow synchronization with respect to all hosting ASCEs. When shadow synchronization is required, an ASCE performs the following synchronization operations for each affected hosting ASCE. The ASCE resets its receiving color pointer cache for that hosting ASCE. The ASCE resets its order decoding state, resets its receiving bitmap cache, resets its receiving colortable cache, resets its receiving desktop save cache, and resets its desktop origin to (0.0) for that hosting ASCE.

The AS protocol does not specify any synchronization when an ASCE detects that another ASCE is no longer hosting. For example, no synchronization is needed when a hosting ASCE becomes inactive or the ASCE receives an ApplicationPDU with action NotifyHostedApplications indicating that zero applications are hosted on a (previously) hosting ASCE. However, an ASCE may use the receipt of an ApplicationPDU with action NotifyHostedApplications and zero applications to free local resources (such as receive caches) that were allocated with respect to that ASCE.

Input Synchronization

Input synchronization is the set of synchronization operations that are associated with the maintenance of keyboard state between controlling and controlled ASCEs. When an ASCE detects that a new ASCE has become active, it resets its sending keyboard state and queue an Input Synchronization event for the next InputPDU. On receipt of an input synchronization event within an InputPDU, an ASCE resets its receiving keyboard state for the issuing ASCE.

Control

The AS protocol provides a set of core control mechanisms whereby ASCEs can implement a range of policies with (potentially) different characteristics—either sequentially or concurrently within the conference. The AS protocol also defines an additional mediated set of control mechanisms, which build upon the core control mechanisms. The core AS control protocol is based on managing the right to provide input to hosted and/or shadow windows. The core control protocol has two modes: detached and cooperating.

In detached mode, an ASCE has the right to provide input to hosted windows, does not have the right to provide input to shadow windows, and denies peer ASCEs the right to provide input to shadow windows that correspond to hosted windows on this ASCE. In practice, this allows an end-user to work with hosted applications without interference from other users—other users cannot supply input, activation changes, or Z-order changes. In cooperating mode, cooperating ASCEs within the conference serially acquire the right to provide input to hosted and shadow windows. At any point in time within the conference, one of the cooperating ASCEs can provide input to hosted and shadow windows—but only when other ASCEs are not detached (it is "In Control") and the other cooperating ASCEs cannot provide input to hosted and shadow windows (they are "Viewing"). When an ASCE does not have the right to provide input to shadow windows (i e., it is detached or cooperating/viewing), the ASCE may still provide information on pointing device movement to other ASCEs. When an ASCE is in one of these control states and still provides this information, then other ASCEs may use the information to provide end-user feedback on the sending ASCE's pointing device activity—which may (for certain terminal types) substantially improve the remote end-users' perception of application sharing usability.

The AS core control protocol does not specify an ASCE's or local terminal's rights to provide input to local windows when in either detached or cooperating modes. The particular policy adopted for local input rights will normally be determined by the particular characteristics of the local terminal. A conference may contain any mix of detached and cooperating ASCEs. ASCEs may freely move between cooperating and detached modes. In contrast, an ASCE can only be in control while it owns the control identifier. Each ASCE (whether cooperating or detached) tracks the current control identifier value within the conference and which ASCE currently holds the identifier. When an ASCE wishes to change the control state of the conference, it shall send a ControlPDU to all ASCEs in the conference. Table 15 shows the ControlPDU.

There are some situations where unconditionally granting control may not be feasible. For example, on some terminal types, certain window manager functions (such as window dragging and/or sizing a local window) need to be explicitly terminated. But if the local ASCE is in cooperating mode and loses control (and hence loses the right to provide any input), it cannot complete the window manager operation, which leaves the operation active and the peer ASCE unable to complete it (because it cannot provide input to a local window on this ASCE). When such a situation applies, an ASCE holding the control identifier may respond to a Request Control ControlPDU with a Grant Control ControlPDU with the current control identifier value and its own MCS User ID (i.e., it grants control to itself). As this is sent to all ASCEs, peer ASCEs, including the requester, treat it as an ordinary exchange of control, and the local ASCE retains control until the problematic operation is complete.

Where an ASCE moves from cooperating to detached mode, it sends a Detach ControlPDU to all ASCEs. Similarly, when an ASCE moves from detached to cooperating mode, it sends a Cooperate ControlPDU to all ASCEs. Changing from cooperating to detached and vice versa is independent of ownership of the control identifier, and an ASCE holding the control identifier may move from cooperating to detached and back to cooperating mode without granting the control identifier if no peer ASCE requests it in the interim.

Control Identifiers

The control identifier is a single value visible to all ASCEs within the conference. The initial control identifier value in a conference is always zero. The initial control identifier holder in a conference is the ASCE whose share identifier is the highest during ASCE activation. Thereafter, the control identifier value changes when an ASCE fails to receive a

TABLE 15

| ControlPDU | |
|---|---|
| Parameter | Description |
| ShareData Header | |
| action | This parameter identifies the particular ControlPDU action. The allowable actions are as follows.<br>• Request Control<br>• Grant Control<br>• Detach<br>• Cooperate |
| grantID | When the action parameter is Grant Control, this parameter specifies the MCS User ID of the ASCE being granted control-i.e., the new control identifier holder. |
| controlID | When the action parameter is Grant Control, this parameter is the control identifier assigned by the sending ASCE. |

When an ASCE wishes to obtain the control identifier, it sends a Request Control ControlPDU to all ASCEs. This ASPDU is sent to all ASCEs (as are all ControlPDUs), so that, even though ASCEs track the ASCE currently holding the control identifier, they may detect situations where the control identifier is in the process of moving, or ASCEs holding the control identifier become inactive or leave the conference.

On receipt of a Request Control ControlPDU, the ASCE holding the control identifier normally sends a Grant Control ControlPDU with the current control identifier value and the MCS User ID of the ASCE to which control is being granted to all ASCEs. This ASPDU is sent to all ASCEs so that all active ASCEs can track the current control identifier owner. When an ASCE receives a Request Control ControlPDU and it is not holding the control identifier, it discards the ASPDU.

Grant Control response to a Request Control ControlPDU (within a reasonable time) or the control identifier holder becomes inactive or leaves the conference. In either case, each detecting ASCE generates a new control identifier by incrementing the last known control identifier value by its MCS User ID and sends a Grant Control ControlPDU referencing itself as the owning ASCE (i.e., it advertises itself as the new control identifier holder). As multiple ASCEs may have detected the problem, this causes a control identifier race, which is won by the ASCE with the highest control identifier value. Thus, if an ASCE receives a Grant Control ControlPDU with a higher control identifier value than the last control identifier value known to that ASCE, it recognizes the higher value as the new control identifier value and the sending ASCE as the new control identifier holder.

When an ASCE detects that a new ASCE has become active, it advertises its control state as follows. If the ASCE is detached, it sends a Detach ControlPDU. If the ASCE is cooperating, it sends a Cooperate ControlPDU. If the ASCE holds the control identifier, it sends a Grant Control ControlPDU referencing itself as the control identifier holder. As a result, new joiners (and existing ASCEs) receive a refresh of each ASCE's control state plus information on the holder of the control identifier.

Interaction with Conducted Mode

Conducted mode operation interacts with the AS control protocol as follows. When a conference enters conducted mode, all ASCEs sends a Cooperate ControlPDU, the ASCE on the conducting node sends a Request Control ControlPDU, and the ASCE holding the control identifier responds with a Grant Control ControlPDU. That is, all ASCEs enter cooperating mode and the conducting ASCE acquires control—all other ASCEs are viewing. When Conductorship moves from one node to another, the new conducting ASCE shall send a Request Control ControlPDU and the ASCE holding the control identifier (i.e., the previous conducting node) responds with a Grant Control ControlPDU. That is, control follows Conductorship.

When the conference exits conducted mode, all ASCEs remain in cooperating mode and the last conducting ASCE retains the control identifier, but ASCEs are once again free to request control and to switch between cooperating and detached modes. That is, the full AS control protocol is reinstated.

Mediated Control

The AS mediated control protocol builds on the core control protocol to provide additional, more conditional, control facilities. The mediated control protocol is negotiable and is supported only where the negotiated capabilities enable it (i.e., when the negotiated Control.controlFlags capability Allow Mediated Control bit flag is set). The mediated control protocol is implemented by a set of request and response messages, which build upon and mediate the effect of the core control protocol. Where the explanation of a mediated control protocol facility or message exchange in this section requires that an ASCE initiate a core control protocol action and/or state change, then it is shown as follows.

Core(Request Control): The ASCE sends a Request Control ControlPDU to take control.

Core(Detach): The ASCE sends a Detach ControlPDU to notify peer ASCEs that it has entered detached mode.

When an ASCE wishes to send a mediated control request or response, it sends a MediatedControlPDU to one or all ASCEs. Table 16 shows the content of the MediatedControlPDU.

TABLE 16

MediatedControlPDU

| Parameter | Description |
| --- | --- |
| ShareData Header action | This parameter identifies the particular MediatedControlPDU action. The allowable actions are as follows.<br>• Take Control Request<br>• Pass Control Request<br>• Detach Request<br>• Confirm Take Response<br>• Deny Take Response<br>• Confirm Detach Response<br>• Deny Detach Response<br>• Deny Pass Response<br>• Remote Detach Request<br>• Deny Remote Detach Response |
| passControlFlag | This parameter indicates whether this MediatedControlPDU is part of a Pass Control sequence (see below). Where this parameter is part of a Pass Control sequence, the value is TRUE. On all other MediatedControlPDUs this parameter shall be FALSE. |
| sendingReference | This parameter is a message reference used to correlate requests and responses. Where this MediatedControlPDU is a request (see the action parameter above), this is the reference allocated by the sending ASCE. Where this MediatedControlPDU is a response, this is the reference from the corresponding request. |
| originatorReference | This parameter is a message reference used to correlate requests and responses. Where this MediatedControlPDU is a Take Control request arising from a Pass control request, this parameter is the reference from the originating Pass Control request. Where this MediatedControlPDU is a response, this is the reference from the corresponding request. |
| originatorID | This parameter is a MCS User ID. Where this MediatedControlPDU is a request, this is the MCS User ID of the sending ASCE. Where this MediatedControlPDU is a response, this is the MCS User ID from the corresponding request. |

Taking Control

When an ASCE wishes to take control using the mediated control protocol, its actions depend on the negotiated Control.controlInterest capability value. When the negotiated value is Always, the taking of control is unmediated and the ASCE initiates the Core(Request Control) action to take control. When the negotiated value is Never, one or more peer ASCEs will not permit the taking of control and the ASCE cannot do so. When the negotiated value is Confirm, one or more peer ASCEs require that the taking of control requires confirmation by those peer ASCEs and the ASCE sends a Take Control Request MediatedControlPDU to all ASCEs.

On receipt of a Take Control Request MediatedControlPDU, an ASCE's response depends on its local Control.controlInterest capability value (which should not be Never—or the Request should not have been issued).

When the local value is Always, the ASCE responds with a Confirm Take Response MediatedControlPDU to the requesting ASCE. When the local value is Confirm, the ASCE utilizes a purely local mechanism (such as interacting with the local end-user) to determine whether to allow the requesting ASCE to take control and then responds with either a Confirm Take Response or Deny Take Response MediatedControlPDU to the requesting ASCE accordingly.

On receipt of Confirm Take Response MediatedControlPDUs from all peer ASCEs (i.e., unanimous consent), the requesting ASCE initiates the Core(Request Control) action to take control. However if it receives one or more Deny Take Response MediatedControlPDUs, it abandons the attempt to take control.

Passing Control

When an ASCE wishes to pass control to a specific peer ASCE using the mediated control protocol, its actions depend on its local Control.controlInterest capability value. When the local value is Never (i.e., this ASCE never gives up control), it does not attempt to pass control. When the local value is Always or Confirm, it sends a Pass Control Request MediatedControlPDU to the particular ASCE.

On receipt of a Pass Control Request MediatedControlPDU, an ASCE utilizes a purely local mechanism (such as interacting with the local end-user) to determine whether to accept control from the requesting ASCE. If it determines not to accept the pass request, it responds with Deny Pass Response MediatedControlPDU to the requesting ASCE. If it determines to accept the pass request, it sends a Take Control Request to the requesting ASCE, which should in turn result in receipt of a Confirm Take Response MediatedControlPDUs from the requesting ASCE, whereupon it can initiate the Core(Request Control) action to take control. The Take Control Request MediatedControlPDU is sent to a single peer ASCE in response to a Pass Control Request MediatedControlPDU, it is sent to all peer ASCEs to conditionally take control. To distinguish between the two cases, all MediatedControlPDUs used as part of the pass control sequence (i.e., Pass Control Request, Take Control Request to one ASCE and Deny Pass Response) have the passControlFlag parameter set to TRUE—it is FALSE in all other MediatedControlPDUs.

Detaching

When an ASCE wishes to detach using the mediated control protocol, its actions depend on the negotiated Control.detachInterest capability value. When the negotiated value is Always, detaching is unmediated and the ASCE initiates the Core(Detach) action to detach. When the negotiated value is Never, one or more peer ASCEs will not permit ASCEs to detach and the ASCE cannot do so. Where the negotiated value is Confirm, one or more peer ASCEs require that detaching requires confirmation by those peer ASCEs and the ASCE sends a Detach Request MediatedControlPDU to all ASCEs.

On receipt of a Detach Request MediatedControlPDU, an ASCE's response depends on its local Control.detachInterest capability value (which should not be Never—or the Detach Request should not have been issued). When the local value is Always, the ASCE responds with a Confirm Detach Response MediatedControlPDU to the requesting ASCE. When the local value is Confirm, the ASCE utilizes a purely local mechanism (such as interacting with the local end-user) to determine whether to allow the requesting ASCE to take control and then responds with either a Confirm Detach Response or Deny Detach Response MediatedControlPDU to the requesting ASCE accordingly.

On receipt of Confirm Detach Response MediatedControlPDUs from all peer ASCEs (i.e. unanimous consent), the requesting ASCE initiates the Core(Detach) action to detach. However if it receives one or more Deny Detach Response MediatedControlPDUs then it abandons the attempt to detach.

Remote Detach

When an ASCE wishes to detach a peer ASCE, its actions depend on the Control.remoteDetachFlag capability value for the peer ASCE. When the value is FALSE, the peer ASCE does not allow remote detach and the ASCE abandons the attempt. When the value is TRUE, the ASCE sends a Remote Detach Request MediatedControlPDU to the particular ASCE.

On receipt of a Remote Detach Request MediatedControlPDU, an ASCE attempts to start the detach process. If it cannot initiate the detach attempt (because one or more peer ASCEs will not permit ASCEs to detach) it responds with a Deny Remote Detach Response MediatedControlPDU to the requesting ASCE.

MediatedControlPDUs are either sent to all peer ASCEs or to specific peer ASCEs depending on the message type. Table 17 summarizes the sending characteristics for MediatedControlPDU requests and responses.

TABLE 17

MediatedControlPDU MCS Channels

| Request/Response | Target |
|---|---|
| Take Control Request | All ASCEs |
| Take Control Request | Peer ASCE |
| Pass Control Request | Peer ASCE |
| Detach Request | All ASCEs |
| Confirm Take Response | Peer ASCE |
| Deny Take Response | Peer ASCE |
| Confirm Detach Response | Peer ASCE |
| Deny Detach Response | Peer ASCE |
| Deny Pass Response | Peer ASCE |
| Remote Detach Request | Peer ASCE |
| Deny Remote Detach Response | Peer ASCE |

Figure 6:
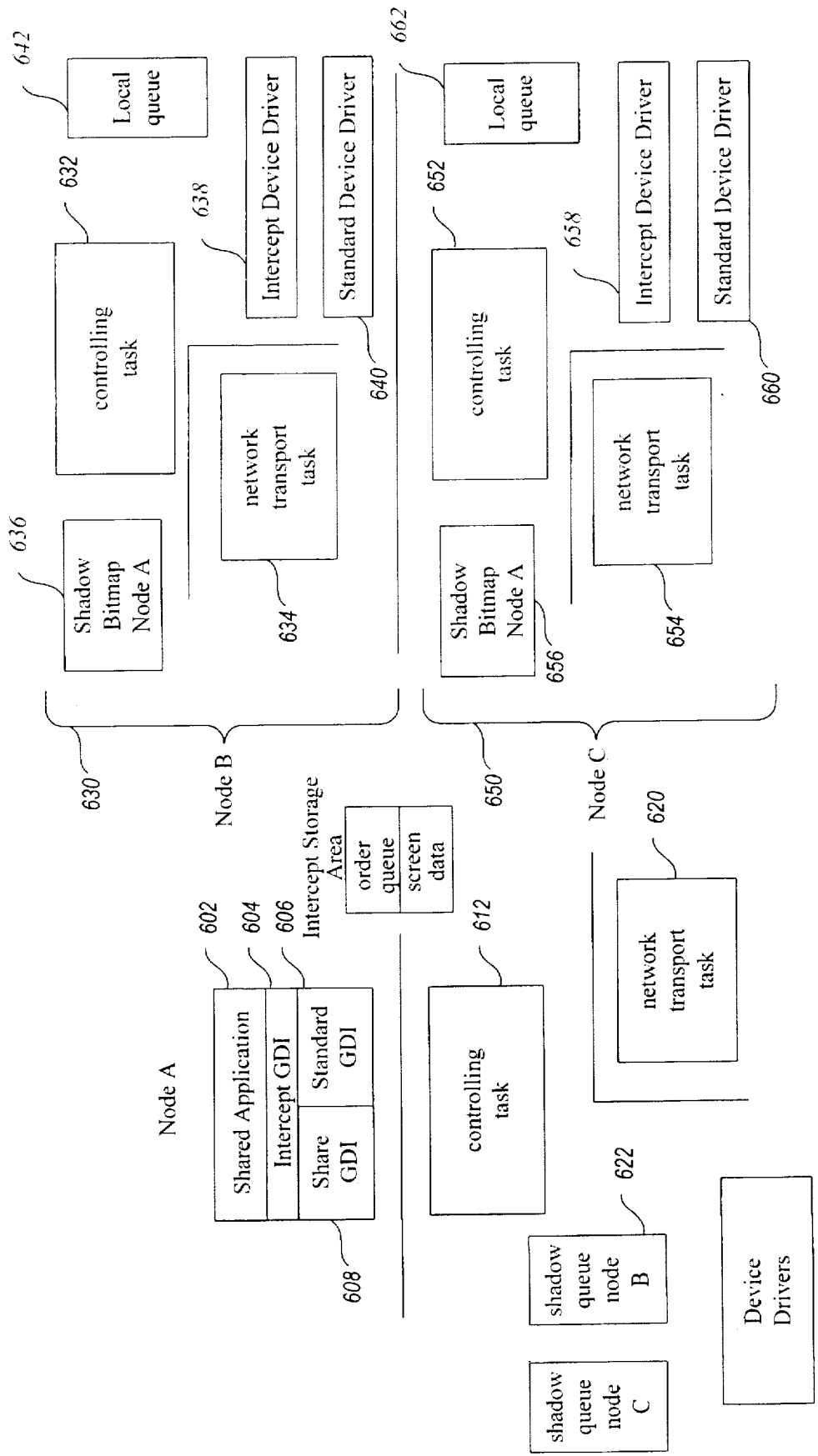
FIG. 6 is a block diagram illustrating an implementation of an ASCE.

FIG. 6 is a block diagram illustrating an implementation of an ASCE. In this example, Node A is hosting an application that is shared by Nodes B and C. On the host computer system, the first task corresponds to the execution of the shared application program 602, the second task corresponds to the execution of the ASCE 612, and the third task corresponds to the execution of a network transport task 620 (MCS and GCC). When the MAS system is initially installed on the host computer system, the MAS system inserts various hooks in the operating system to allow the MAS system to intercept input and output data and to forward intercepted data to the operating system.

In the following, an overview of aspects of the preferred operating system is described that relate to the installation of the hooks. In the described embodiment, the hooks are installed on a computer system operating under the control of the Windows operating system. The computer system includes a central processing unit, memory, and secondary storage. The MAS system may be stored on a computer-readable medium, such as a CD-ROM or disk. Other operating systems typically provide a mechanism for intercepting input and output data. Thus, one skilled in the art would appreciate that the principles of the present invention can be used in conjunction with differing operating systems. The Windows operating system provides a standard graphical device interface (GDI) layer, which is used by application programs to transmit output data to display devices, and a standard device driver (DD) layer, which is used to handle device interrupts. The standard GDI layer provides various functions that can be called by an application program to transmit output data to a display device. For example, the standard GDI layer can provide a function for displaying a specified string of text at a specified display location in a specified font. The standard GDI layer is typically linked at run time into the address space of each application program that invokes its functions. The standard DD layer provides various device drivers to handle interrupts and to forward input data to the operating system.

To intercept output data, the MAS system installs an intercept GDI layer 604 in place of the standard GDI layer 606 provided by the operating system. The intercept GDI layer provides an intercept function for each function of the standard GDI layer. Each intercept function has a prototype that is identical to the prototype of the corresponding standard function. In this way, a shared application program 602 (actually all application programs whether shared or not) is linked to the intercept GDI layer when the application program is loaded, rather than the standard GDI layer. Thus, all calls directed to the standard GDI layer are actually calls to the intercept GDI layer. The called intercept GDI function either calls the corresponding standard GDI function or calls a share GDI layer 608 provided by the MAS system. The share GDI layer contains a function for each function of the standard GDI layer that the MAS system needs to intercept. (The MAS system would not need to intercept a GDI function that only returns status information.) The share GDI functions store data describing the called GDI function and its parameters in an intercept storage area 610. The share GDI function also invokes the corresponding standard GDI function to output data to the host window. (In the Windows NT system, the intercepting of output data is performed at the display driver interface level.)

Periodically, the controlling task 612 receives control. The controlling task retrieves the output data stored on the intercept storage area and packets the output data for transmission to the shadow computer system. The packeted data is forwarded to the network transport task 620. The network transport task 620 then broadcasts the packeted data to each shadow computer system 630 and 650. The network transport tasks 634 and 654 of the shadow computer systems receive the packeted data and forward it to the respective controlling tasks 632 and 652 of each shadow computer system, which unpacket the output data and control the displaying of the output data in the respective shadow windows.

To support displaying the output data, each shadow computer system maintains a shadow bitmap 636 and 656 for each host computer system. A shadow bitmap contains an in memory copy of the shared windows of a host computer system. All updates to the host windows are reflected in both the shadow bitmap and the shadow window. The shadow bitmap is used for handling "paint" messages received from the operating system of the shadow computer system. The operating system transmits a "paint" message to a window (via a window procedure for the window) whenever a portion of a window that was previously obscured now becomes visible. The shadow window is responsible for repainting the now visible portion. Thus, whenever a "paint" message is received by the shadow window, the shadow window retrieves the output data for the repaint from the shadow bitmap. Thus, when the controlling task receives output data, it stores the output data in the shadow bitmap and notifies the operating system that the displayed shadow window (or a portion of it) is no longer valid. The operating system then generates and transmits a "paint" message to the shadow window. When the shadow window receives the "paint" message, the shadow window is updated.

The MAS system at a shadow computer system, such as Node B 630, installs an intercept DD layer 638 to intercept calls from the standard DD layer 640 to the operating system. When a user of the shadow computer system inputs data for the shared application program, the standard device driver for the input device is executed and calls the intercept DD layer. The intercept device driver stores the input data into a local queue 642 and forwards the interrupt to the operating system to process the input data as normal by generating a message to broadcast to the shadow window describing the input data. The controlling task intercepts all messages generated by the operating system that are directed to an application program. When a message is intercepted that is directed to the shadow window, the controlling task 632 retrieves the corresponding input data from the local queue that caused the intercepted message to be generated. The controlling task then packets the input data and forwards the packeted input data to the network transport task 634. The network transport task 634 of the shadow computer system then transmits the packeted input data to the network transport task 620 of the host computer system. The network transport task 620 forwards those packeted input data to the controlling task 612 of the host computer system. The controlling task stores the input data in a shadow queue 622 for the shadow computer system at Node B. The host computer system has a shadow queue for each computer system with which it is sharing an application program. The controlling task 612 retrieves the input data from the shadow queue 622 forwards the input data to the operating system. The operating system then generates messages corresponding to the input data and transmits the messages to the host window. In this way, the shared application program treats input data entered on the shadow computer system as if it were generated locally at the host computer system.

Since the MAS system resides on both a host computer system and a shadow computer system, each computer system can function as both a host computer system and a shadow computer system simultaneously. That is, each computer system can be executing a shared application program and displaying a shadow window of another shared application program that is executing on another computer system. The patent application programs U.S. Patent Application program application Ser. No. 08/498,940, entitled "Method and System for Sharing Application programs Between a Host Computer System and a Shadow Computer System," and U.S. Patent Application program application Ser. No. 08/498,329 entitled "Method and System for Transmitting Data for a Shared Application program," filed concurrently on Jul. 5, 1995 describe these aspects in more detail, and are hereby incorporated by reference.

CAPABILITY SETS

General Capability Set

The General capability set provides capabilities for the general characteristics of the issuing ASCE.

TABLE APP-1

General Capability Set

| Capability | Description | Class | Rule |
|---|---|---|---|
| OSMajorType | This capability indicates the operating system major type. Allowable values as follows.<br>• Unspecified<br>• Windows<br>• OS/2<br>• Macintosh<br>• UNIX/X<br>This capability is for information and diagnostic purposes only. | N | info |
| OSMinorType | This capability indicates the operating system minor type. The values depend on the OSMajorType capability (see above). Allowable values are as follows.<br><br>OSMajorType    OSMinorType<br><br>Windows    Unspecified<br>    Windows3.1x<br>    Windows 95<br>    Windows NT<br>OS/2    Unspecified<br>    OS/2 Warp (Intel x86)<br>    PowerPC<br>Macintosh    Unspecified<br>    Macintosh<br>    PowerPC<br>UNIX/X    Unspecified<br>    Native Server<br>    Pseudo Server<br>Unspecified    Unspecified<br>This capability is for information and diagnostic purposes only. | N | info |
| protocolVersion | This capability specifies the protocol version level. The allowable value is 0 × 0200 (indicating major and minor versions of 2 and 0 respectively). | N | info |
| generalCompressionTypes | This capability is a set of bit flags itemizing which (if any) non-standard general compression schemes are supported by this ASCE. Interpretation of this field depends on the negotiated generalcompressionLevel capability as follows.<br>• If the negotiated generalcompressionLevel capability is zero, then only the least significant bit flag of this field is valid (i.e. bit 0).<br>• If the negotiated generalCompressonLevel capability is greater than zero, then all bit flags within this field are valid. | F | min |
| updateCapabilityFlag | This capability indicates whether this ASCE can receive the UpdateCapabilityPDU. A value of TRUE indicates that it can receive the UpdateCapabilityPDU and a value of FALSE indicates that it cannot. | L | one |
| remoteUnshareFlag | This capability indicates whether this ASCE can receive an ApplicationPDU with the UnhostApplication action. A value of TRUE indicates that it can receive an ApplicationPDU with the UnhostApplication action and a value of FALSE indicates that it cannot. | L | one |
| generalCompressionLevel | This capability indicates which level of general compression scheme handling is supported by this ASCE. | N | min |

Bitmap Capability Set

The Bitmap capability set provides capabilities for the bitmap oriented characteristics of the issuing ASCE.

TABLE APP-2

Bitmap Capability Set

| Capability | Description | Class | Rule |
|---|---|---|---|
| preferredBitsPerPixel | This capability indicates this ASCE's preferred format for receipt of bitmap data. Allowable values are 1, 4 and 8. | N | group |
| receive1BitPerPixelFlag | This capability indicates whether this ASCE can receive 1 bit-per-pixel bitmap data. An ASCE is required to be able to receive 1 bit-per-pixel bitmap and shall set this parameter to TRUE. | L | group |

TABLE APP-2-continued

Bitmap Capability Set

| Capability | Description | Class | Rule |
|---|---|---|---|
| receive4BitsPerPixelFlag | This capability indicates whether this ASCE can receive 4 bits-per-pixel bitmap data. A value of TRUE indicates that it can receive 4 bits-per-pixel bitmap data and a value of FALSE indicates that it cannot. Where an ASCE specifies that it can receive 4 bits-per-pixel, then it must also receive 1 bit-per pixel. | L | group |
| receive8BitsPerPixelFlag | This capability indicates whether this ASCE can receive 8 bits-per-pixel bitmap data. A value of TRUE indicates that it can receive 8 bits-per-pixel bitmap data and a value of FALSE indicates that it cannot. Where an ASCE specifies that it can receive 8 bits-per-pixel, then it must also receive 1 and 4 bits-per-pixel. | L | group |
| desktopWidth | This capability specifies this ASCE's current desktop width in pixels. | N | group |
| desktopHeight | This capability specifies this ASCE's current desktop height in pixels. | N | group |
| desktopResizeFlag | This capability indicates whether this ASCE can receive UpdateCapabilityPDUs containing a Bitmap capability set as a result of a peer ASCE desktop resize. A value of TRUE indicates that it can receive an UpdateCapabilityPDU containing a Bitmap capability set and a value of FALSE indicates that it cannot. | L | one |
| bitmapCompressionFlag | This capability indicates whether this ASCE can receive compressed bitmap data in UpdatePDU (Bitmap) and in Cache Bitmap orders. | L | min |

Sending Bits-Per-Pixel Capabilities Negotiation

The Bitmap capability set preferredBitsPerPixel, receive1BitPerPixelFlag, receive4BitsPerPixelFlag and receive8BitsPerPixelFlag capabilities are negotiated as a group to determine the sendingBitsPerPixel used by each ASCE when sending color information and bitmap data.

The capabilities algorithm for this group determines a final sendingBitsPerPixel for a particular ASCE using the advertised capability values, as follows.

- set combinedBitsPerPixel to the minimum of this ASCE's preferredBitsPerPixel value and the maximum of all other ASCEs' preferredBitsPerPixel values
- if the combinedBitsPerPixel is 1 then set sendingBitsPerPixel to 1
- else if combinedBitsPerPixel is less than or equal to 4 and all other ASCEs can receive 4 bits-per-pixel then sendingBitsPerPixel is 4
- else if all other ASCEs can receive 8 bits-per-pixel then sendingBitsPerPixel is 8
- else if all other ASCEs can receive 4 bits-per-pixel then sendingBitsPerPixel is 4
- else sendingBitsPerPixel is 1.

The Bitmap capability set contains a receive1BitPerPixelFlag capability, but this does not play a part in the negotiation, as the requirement to support lower color depths (i.e. to support at least 1 bit-per-pixel if it supports 4 bits-per-pixel and to support 1 and 4 bits-per-pixel if it supports 8 bits-per-pixel) means that all ASCEs must support 1 bit-per-pixel.

An ASCE may use an alternate private algorithm in certain circumstances. For example, certain 8 bits-per-pixel terminals do not reliably generate 4 bits-per-pixel bitmap data. Where this is the case and the negotiated receive8BitsPerPixel value is TRUE, the ASCE may set sendingBitsPerPixel to 8, even where the combinedBitsPerPixel value is 4. However, where an ASCE does use a private algorithm, it shall still generate a sendingBitsPerPixel value which is less than or equal to the value generated by the recommended algorithm and is consistent with the minimum values of all other ASCEs' receive1BitPerPixelFlag, receive4BitsPerPixelFlag and receive8BitsPerPixelFlag capabilities.

Desktop Size Capabilities Negotiation

The Bitmap capability set desktop width and desktop height capabilities are independently negotiated to determine the size of the virtual desktop.

The capabilities negotiation algorithm essentially uses the max rule, but the candidate values are the capability values advertised by all active hosting ASCEs, which may or may not include the determining ASCE.

For example, in a conference with four active ASCEs-ASCEs A, B, C and D where:

- ASCE A advertises Bitmap.desktopWidth and Bitmap.desktopHeight as 800 and 600 respectively
- ASCE B advertises Bitmap.desktopWidth and Bitmap.desktopHeight as 1024 and 768 respectively
- ASCE C advertises Bitmap.desktopWidth and Bitmap.desktopHeight as 1600 and 1200 respectively
- ASCE D advertises Bitmap.desktopWidth and Bitmap.desktopHeight as 640 and 480 respectively
- then if ASCEs A and C are hosting, the negotiated virtual desktop capability values are 1600 by 1200
- whereas if ASCEs B and D are hosting, the negotiated virtual desktop capability values are 1024 by 768.

Order Capability Set

The Order capability set provides capabilities for the order characteristics of the issuing ASCE.

TABLE APP-3

Order Capability Set

| Capability | Description | | Class | Rule |
|---|---|---|---|---|
| terminalDescriptor | This capability is a null-terminated character T.50 test string which may be used to identify local terminal characteristics for information and diagnostics purposes. | | S | info |
| desktopSaveXGranularity | This capability specifies the minimum X granularity in pixels for this ASCE when receiving Desktop Save orders. | | N | max |
| desktopSaveYGranularity | This capability specifies the minimum Y granularity in pixels for this ASCE when receiving Desktop Save orders. | | N | max |
| maximumOrderLevel | This capability specifies the maximum order level supported within the orderSupport capability. | | N | info |
| numberFonts | This capability is the maximum number of matchable fonts for this ASCE, details of which are subsequently supplied in the FontPDU. | | N | info |
| orderFlags | This capability is a set of bit flags indicating the order support provided by this ASCE. Defined bit flag values are as follows. | | F | min |
| | Negotiate order support | It is mandatory to set this flag. | | |
| | Cannot Receive Orders | If this flag is set, it indicates that this ASCE cannot receive orders. | | |
| | An ASCE shall always set the Negotiate order support flag. | | | |
| orderSupport | This capability is an array of 32 order levels indexed by order type. The allowable array indices are as follows. All other array values shall be set to zero. See below for further information on order levels. | | N | min |
| | Order | Index | | |
| | Destination Blt Support | 0 | | |
| | Pattern Blt Support | 1 | | |
| | Screen Blt Support | 2 | | |
| | Memory Blt Support | 3 | | |
| | Memory Three Way Blt Support | 4 | | |
| | Text Support | 5 | | |
| | Extended Text Support | 6 | | |
| | Rectangle Support | 7 | | |
| | Line Support | 8 | | |
| | Frame Support | 9 | | |
| | Opaque Rectangle Support | 10 | | |
| | Desktop Save Support | 11 | | |
| textFlags | This capability is a set of bit flags indicating font matching and text options supported by this ASCE. Defined bit flag values are as follows. | | F | min |
| | Check font aspect | If this flag is set, it indicates that this ASCE supports the checking of font signatures during font matching. | | |
| | Check font signatures | If this flag is set, it indicates that this ASCE supports the checking of font signatures during font matching. | | |
| | DeltaX simulation | If this flag is set, it indicates that this ASCE allows Delta X approximations during font matching. | | |
| | Baseline Start | If this flag is set, it indicates that this ASCE can receive Text and Extended Text orders where the text start position is specified with respect to the character baseline. | | |
| desktopSaveSize | This capability specifies the total size in pixels of this ASCE's desktop cache per hosting ASCE. | | N | min |

Order Levels

The AS protocol allows for future enhancement of order support using order levels. Order level values are in the range 0.255, with the value 0 indicating that the indicated order is not supported.

The order level values in the Order.orderSupport capability indicate the maximum order level that the issuing ASCE can receive on an order by order basis. If an ASCE indicates that it can receive order level N for a particular order, then it shall be able to receive order levels in the range 1 ... N.

It is envisaged that as additional application sharing requirements emerge (e.g., reflecting changing order usage in target terminals), then existing AS orders may be enhanced. Where that is the case, an ASCE may advertise support for a range of enhanced orders and, where it is in a conference with a group of active ASCEs that also support the enhanced orders may use them when constructing UpdatePDU (Orders) ASPDUs. In summary, this means that:

where an ASCE supports an order at order level N, it shall be prepared to receive orders at order levels 1 ... N where an ASCE supports an order at order level N and the negotiated order level is greater than or equal than N, then the ASCE may send the order at order levels 1 . . . N where an ASCE supports an order at order level N and the negotiated order level is less than N, then the ASCE may send the order at order levels 1 through the negotiated value—but may not send orders at order levels greater than the negotiated value.

Order level support is not defined for the Desktop Origin, Cache Bitmap and Cache ColorTable orders. In the absence of order level support for these orders:

if an ASCE supports the Screen Blt order at order level 1 or above, it shall also support the Desktop Origin order at order level 1 or above if an ASCE supports either of the Memory Blt and Memory Three Way Blt orders at order level 1 or above, it shall also support the Cache Bitmap and Cache ColorTable orders at order level 1 or above and shall ensure that it advertises valid values for the Bitmap Cache and ColorTable Cache capability sets.

Bitmap Cache Capability Set

The Bitmap Cache capability set provides capabilities for the bitmap cache characteristics of the issuing ASCE. These capabilities are used to negotiate values used to construct Cache Bitmap orders in UpdatePDUs.

If an ASCE supports either of the Memory Blt and Memory Three Way Blt orders at order level 1 or above, it shall support the Cache Bitmap order at order level 1 or above and ensure that it advertises Bitmap Cache capability set values with:

non-zero values for the cache1Entries, cache2Entries and cache3Entries capabilities allowable values for the cache1MaximumCellSize, cache2MaximumCellSize and cache3MaximumCellSize capabilities (as specified in Tables 0–9 and 0–10)

cache3MaximumCellSize>=cache2MaximumCellSize>=cache1MaximumCellSize.

Where an ASCE supports bitmap caching, these capabilities indicate the bitmap cache sizes per each other hosting ASCE. That is, by advertising these capabilities, the ASCE is committing to provide a set of bitmap caches of the advertised sizes for each other active ASCE in the conference that is hosting windows.

TABLE APP-4

Bitmap Cache Capability Set

| Capability | Description | Class | Rule |
|---|---|---|---|
| cache1Entries | This capability is the number cache entries in the first cache area. | N | min |
| cache1MaximumCellSize | This capability is the maximum cell size in octets for the first cache area. The value for this capability is in the range 256..16384. | N | min |
| cache2Entries | This capability is the number of cache entries in the second cache area. | N | min |
| cache2MaximumCellSize | This capability is the maximum cell size in octets for the second cache area. The value for this capability is in the range 256..16384. | N | min |
| cache3Entries | This capability is the number of cache entries in the third cache area. | N | min |
| cache3MaximumCellSize | This capability is the maximum cell size in octets for the third cache area. The value for the capability is in the range 256..16384. | N | min |

ColorTable Cache Capability Set

The ColorTable Cache capability set provides capabilities for the colortable cache characteristics of the issuing ASCE. These capabilities are used to negotiate values used to construct Cache ColorTable orders in UpdatePDUs.

If an ASCE supports either of the Memory Blt and Memory Three Way Blt orders at order level 1 or above, it shall support the Cache ColorTable order at order level 1 or above and ensure that it advertises a ColorTable Cache capability set containing a non-zero value for the colorTableCacheSize capability.

Where an ASCE supports colortable caching, these capabilities indicate the colortable cache size per each other hosting ASCE. That is, by advertising these capabilities, the ASCE is committing to provide a colortable cache of the advertised size for each other active ASCE in the conference that is hosting windows.

TABLE APP-5

ColorTable Cache Capability Set

| Capability | Description | Class | Rule |
|---|---|---|---|
| colorTableCacheSize | This capability specifies the number of colortable entries in this ASCE's receiving colortable cache. Where an ASCE supports colortable caching, the allowable values are in the range 1..255 (zero is not allowed). | N | min |

Window Activation Capability Set

The Window Activation capability set provide capabilities for the window activation characteristics of the issuing ASCE, and in particular about its support for specific WindowActivationPDU activation messages.

Pointer Capability Set

The Pointer capability set provides capabilities for the pointer characteristics of the issuing ASCE. These capabilities are used to negotiate values used to construct PointerPDUs.

TABLE APP-6

Window Activation Capability Set

| Capability | Description | Class | Rule |
| --- | --- | --- | --- |
| helpKeyFlag | This capability indicates whether this ASCE can receive WindowActivationPDUs containing the ActivationHelpKey action. A value of TRUE indicates that it can receive WindowActivationPDUs containing the ActivationHelpKey action and a value of FALSE indicates that it cannot. | N | one |
| helpIndexKeyFlag | This capability indicates whether this ASCE can receive WindowActivationPDUs containing the ActivationHelpIndexKey action. A value of TRUE indicates that it can receive WindowActivationPDUs containing the ActivationHelpIndexKey action and a value of FALSE indicates that it cannot. | N | one |
| helpExtendedKeyFlag | This capability indicates whether this ASCE can receive WindowActivationPDUs containing the ActivationHelpExtendedKey action. A value of TRUE indicates that it can receive WindowActivationPDUs containing the ActivationHelpExtendedKey action and a value of FALSE indicates that it cannot. | L | one |
| windowManagerMenuFlag | This capability indicates whether this ASCE can receive WindowActivationPDUs containing the WindowManagerMenu action. A value of TRUE indicates that it can receive WindowActivationPDUs containing the WindowManagerMenu action and a value of FALSE indicates that it cannot. | L | one |

Control Capability Set

The Control capability set provides capabilities for the control characteristics of the issuing ASCE. These capabilities are used to negotiate values used in the management of control and detached status between ASCEs.

Where an ASCE does not support color pointers, or where it supports color pointers but does not wish to support color pointer caching, then it should advertise its Pointer.colorPointercacheSize as one. This shall be interpreted as indicating that the advertising ASCE can only remember the last

TABLE APP-7

Control Capability Set

| Capability | Description | Class | Rule |
| --- | --- | --- | --- |
| controlFlags | This capability indicates this ASCE's behavior for changes of control. Allowable values are as follows.<br>• Allow Mediated Control<br>If an ASCE does not set the Allow Mediated Control bit flag capability, the ASCE does not support the AS mediated control protocol. Where this is the case, the remoteDetachFlag, controlInterest and detachInterest capabilities need not be negotiated and the MediatedControlPDU is not valid. | F | min |
| remoteDetachFlas | This capability indicates whether this ASCE allows other ASCEs to force it into detached control mode. A value of TRUE indicates that this ASCE allows other ASCEs to force it into detached control mode and a value of FALSE indicates that it does not. | L | one |
| controlInterest | This capability indicates this ASCE's behavior for changes of control. Allowable values are as follows.<br>• Always  This ASCE always permits changes of control.<br>• Confirm  This ASCE requires to confirm changes of control.<br>• Never  This ASCE never allows changes of control. | N | max |
| DetachInterest | This capability indicates this ASCE's behavior for changes in detach status. Allowable values are as follows.<br>• Always  This ASCE always permits changes in detach status.<br>• Confirm  This ASCE requires to confirm changes in detach status.<br>• Never  This ASCE never allows changes in detach status. | N | max Note 1 | monochrome and/or color pointer (depending on the negotiated value of the Pointer.colorPointerFlag)—that is, it does not support pointer caching.

Where an ASCE supports color pointers and color pointer caching, these capabilities indicate the color pointer cache size per each other hosting ASCE. That is, by advertising these capabilities, the ASCE is committing to provide a color pointer cache of the advertised size for each other active ASCE in the conference that is hosting windows.

TABLE APP-8

Pointer Capability Set

| Capability | Description | Class | Rule |
|---|---|---|---|
| colorPointerFlag | This Capability indicates whether this ASCE supports color pointers. A value of TRUE indicates that this ASCE supports color pointers and a value of FALSE indicates that it does not. | L | min |
| colorPointerCacheSize | This capability specifies the number of entries in this ASCE's receiving color pointer cache. The allowable values are in the range 1..500. Where an ASCE does not support color pointers, it shall set this capability to 1 (a value of zero is not allowed). | N | min |

Share Capability Set

The Share capability set provides information about the node on which the ASCE executes.

TABLE APP-9

Share Capability Set

| Capability | Description | Class | Rule |
|---|---|---|---|
| nodeID | This capability is the GCC node ID of the advertising ASCE's node. | N | info |

Capability Update

An ASCE may advertise changes in a capability set by sending an UpdateCapabilityPDU to other ASCEs within the conference. An ASCE only sends the UpdateCapabilityPDU when both the negotiated General.updateCapabilityFlag and Bitmap.desktopResizeFlag capabilities are TRUE. The only allowable capability set that can be advertised in an UpdateCapabilityPDU is the Bitmap capability set.

TABLE APP-10

UpdateCapabilityPDU

| Parameter | Description |
|---|---|
| ShareData Header | |
| UpdateCapabilitySet | This parameter shall be a bitmap capability Set. |

When an ASCE determines that one or more capabilities have been updated, it shall perform any required capabilities negotiation and shall perform hosting synchronization (if it is hosting) and shadow synchronization.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for coordinating the exchange of data of computer systems that are sharing an application, each computer system having a local share identifier, the method comprising:

when a computer system is inactive in the sharing of the application, setting the local share identifier to invalid;

when a computer system is to become active in the sharing of the application,
generating a share identifier for the computer system;
setting the local share identifier to the generated share identifier; and
sending the generated share identifier along with a demand to become active;

when a computer system receives a demand to become active,
when the local share identifier is invalid, setting the local share identifier to the share identifier received with the demand to become active; and
when the local share identifier is valid, setting the local share identifier to the greater of the local share identifier and the share identifier received with the demand to become active;

when a computer system is to confirm a demand to become active, sending the local share identifier along with a confirmation to become active;

when a computer system receives a confirmation to become active,
when the local share identifier is invalid, setting the local share identifier to the share identifier received with the confirmation to become active; and
when the local share identifier is valid, setting the local share identifier to the greater of the local share identifier and the share identifier received with the confirmation to become active;

when a computer system sends data to another computer system, sending the local share identifier along with the data; and when a computer system receives data sent from another computer system, disregarding the data when the local share identifier does not match the share identifier that is sent with the data.

2. The method of claim 1 wherein the share identifier contains a combination of an identification of the computer system that generates the share identifier and a counter.

3. The method of claim 2 wherein a computer system generates a share identifier by incrementing the counter portion of the last share identifier that it generated.

4. A method for coordinating activation of computer systems in the sharing of an application program, the method comprising:

when a computer system is to become active, sending a demand to become active to each other computer system; and when a computer system receives a demand to become active, when the computer system is active, sending a confirmation to become active to each other computer system; and when the computer system is not active, determining whether the computer system is to become active; and when the computer system has determined to become active, sending a confirmation to become active to each other computer system.

5. The method of claim 4 wherein each demand and confirmation to become active includes the capabilities of the sending computer system.

6. The method of claim 4 including when a computer system is to become active, sending a request to become active to each other computer system before sending the demand to become active; and when a computer system that is active receives a request to become active, sending a confirm to become active to each other computer system.

7. The method of claim 6 wherein each demand, request, and confirmation to become active includes the capabilities of the sending computer system.

8. A method for coordinating control of input to an application shared by a plurality of computer systems, the method comprising:

selecting one of the computer systems as having control of the input and providing to each computer system a control identifier indicating that the selected computer system is in control;

when a computer system wishes to take control, sending a request for control along with the identification of the requesting computer system to all computer systems;

when the computer system that is currently in control receives the request for control, sending a grant of control along with the identification of the requesting computer system and the control identifier to all computer systems;

when a computer system that is not currently in control receives the request for control, discarding the request; and when a computer system receives the grant of control, recording that the identification of the requesting computer system and the control identifier.

9. The method of claim 8 including:

when a computer system detects that the computer system currently in control becomes inactive, incrementing the control identifier by the identifier of the computer system; and sending a grant of control along with the identification of the computer system and the control identifier to all computer systems; and when a computer system receives a grant of control, when the control identifier in the grant of control is higher than its current control identifier, saving the identification of the computer system and the higher control identifier so that it is aware of which computer system is in control.

10. The method of claim 8 including when a computer system becomes active, the computer system currently in control sends to the computer system that is becoming active a grant of control identifying itself as being in control.

11. A method for coordinating the exchange of data of a plurality of computer systems that are sharing a computer program, the method comprising:

when a computer system is to become active, generating a local share identifier based on a previous share identifier;

sending the local share identifier to the other computer systems;

receiving a share identifier from another computer system; and setting the local share identifier to the greater of the generated local share identifier and the received share identifier;

receiving data from another computer system, the data including a share identifier; and when the local share identifier does not match a share identifier received with the data, disregarding the received data so that a unique share identifier is generated for unique sets of active computer systems and so that when multiple computer systems become active, synchronization problems are avoided.

12. The method of claim 11 wherein a share identifier includes a counter and the generating of the local share identifier increments the counter of the previous share identifier.

13. The method of claim 11 wherein a share identifier includes a counter and an identifier of the computer system that generated the share identifier.

14. The method of claim 13 wherein when the counters of the share identifiers are equal selecting the share identifier with the identifier of the computer system that is greater.

15. The method of claim 11 wherein when the computer system receives a share identifier from another computer system that is to become active, setting the local share identifier to the greater of the local share identifier and the received share identifier.

16. The method of claim 11 wherein when the computer system receives a share identifier from another computer system that is to become active, setting the local share identifier to the received share identifier.

17. The method of claim 11 wherein the plurality of computer systems includes at least three computer systems.

18. A computer-readable medium for coordinating the exchange of data of a plurality of computer systems that are sharing a computer program, by:

for each computer system, when the computer system is to become active, generating a local share identifier;

sending the local share identifier to the other computer systems;

receiving a share identifier from another computer system; and setting the local share identifier to the greater of the generated local share identifier and the received share identifier;

receiving data from another computer system, the data including a share identifier; and when the local share identifier does not match a share identifier received with the data, disregarding the received data.

19. The computer-readable medium of claim 18 wherein a share identifier includes a counter and the generating of the local share identifier increments the counter of the previous share identifier.

20. The computer-readable medium of claim 18 wherein a share identifier includes a counter and an identifier of the computer system that generated the share identifier.

21. The computer-readable medium of claim 20 wherein when the counters of the share identifiers are equal selecting the share identifier with the identifier of the computer system that is greater.

22. The computer-readable medium of claim 18 wherein when the computer system receives a share identifier from another computer system that is to become active, setting the local share identifier to the greater of the local share identifier and the received share identifier.

23. The computer-readable medium of claim 18 wherein when the computer system receives a share identifier from another computer system that is to become active, setting the local share identifier to the received share identifier.

* * * * *

UNITED STATES PATENT AND TRADEMARK OFFICE
CERTIFICATE OF CORRECTION

PATENT NO. : 5,949,975  Page 1 of 1
DATED : September 7, 1999
INVENTOR(S) : Batty et al.

It is certified that error appears in the above-identified patent and that said Letters Patent is hereby corrected as shown below:

Column 6,
Line 45, ""SITU"" should read -- ITU --.

Column 27,
Line 40, "generalcompressionLevel" should read -- generalCompressionLevel --.

Column 35,
Line 46, "remoteDetachFlas" should read -- remoteDetachFlags --.

Column 37,
Line 13, "Capability" should read -- capability --.

Signed and Sealed this

Thirtieth Day of December, 2003

JAMES E. ROGAN
*Director of the United States Patent and Trademark Office*